United States Patent
Shimizu et al.

(10) Patent No.: US 10,526,533 B2
(45) Date of Patent: Jan. 7, 2020

(54) PROCESS FOR PRODUCING A PHOTOCHROMIC CURED BODY

(71) Applicant: TOKUYAMA CORPORATION, Shunan-shi, Yamaguchi (JP)

(72) Inventors: Yasutomo Shimizu, Shunan (JP); Katsuhiro Mori, Shunan (JP); Junji Momoda, Shunan (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 60 days.

(21) Appl. No.: 15/550,929

(22) PCT Filed: Mar. 8, 2016

(86) PCT No.: PCT/JP2016/057884
§ 371 (c)(1),
(2) Date: Aug. 14, 2017

(87) PCT Pub. No.: WO2016/143910
PCT Pub. Date: Sep. 15, 2016

(65) Prior Publication Data
US 2018/0030341 A1 Feb. 1, 2018

(30) Foreign Application Priority Data
Mar. 10, 2015 (JP) ................................. 2015-046671

(51) Int. Cl.
*C09K 9/02* (2006.01)
*C08G 18/28* (2006.01)
(Continued)

(52) U.S. Cl.
CPC ................ *C09K 9/02* (2013.01); *C08G 18/28* (2013.01); *C08G 18/3844* (2013.01);
(Continued)

(58) Field of Classification Search
None
See application file for complete search history.

(56) References Cited

U.S. PATENT DOCUMENTS 6,828,378 B2 * 12/2004 Okumura ............... A61K 47/40
525/403
2002/0136899 A1 9/2002 deRojas et al.
(Continued)

FOREIGN PATENT DOCUMENTS

EP 3070142 A1 9/2018
JP 1-163287 A 6/1989
(Continued)

OTHER PUBLICATIONS

English translation of the International Preliminary Report on Patentability and Written Opinion of the International Searching Authority (Forms PCT/IB/338, PCT/IB/373 and PCT/ISA/237) issued in International Application No. PCT/JP2016/057884 dated Sep. 21, 2017.
(Continued)

*Primary Examiner* — Peter A Salamon
(74) *Attorney, Agent, or Firm* — Birch, Stewart, Kolasch & Birch, LLP

(57) ABSTRACT

A process for producing a photochromic cured body by curing a photochromic composition comprising (A) a polyiso(thio)cyanate compound having at least two isocyanate groups and/or isothiocyanate groups in one molecule, a poly(thi)ol compound having at least two hydroxyl groups and/or thiol groups in one molecule, (C) a mono(thi)ol compound having one hydroxy group or thiol group in one molecule, and a photochromic compound.

15 Claims, 1 Drawing Sheet

(51) Int. Cl.

| | | |
|---|---|---|
| *C08L 75/04* | (2006.01) | |
| *G02B 1/04* | (2006.01) | |
| *G02B 5/23* | (2006.01) | |
| *G02C 7/10* | (2006.01) | |
| *C08G 18/38* | (2006.01) | |
| *C08G 18/48* | (2006.01) | |
| *C08G 18/64* | (2006.01) | |
| *C08G 18/66* | (2006.01) | |
| *C08G 18/76* | (2006.01) | |
| *G02B 5/22* | (2006.01) | |

(52) U.S. Cl.
CPC ..... *C08G 18/3876* (2013.01); *C08G 18/4825* (2013.01); *C08G 18/6484* (2013.01); *C08G 18/6666* (2013.01); *C08G 18/765* (2013.01); *C08L 75/04* (2013.01); *G02B 1/04* (2013.01); *G02B 5/223* (2013.01); *G02B 5/23* (2013.01); *G02C 7/10* (2013.01); *G02C 7/102* (2013.01)

(56) References Cited

U.S. PATENT DOCUMENTS

| | | | |
|---|---|---|---|
| 2008/0225400 A1 | 9/2008 | Swarup et al. | |
| 2009/0202461 A1* | 8/2009 | Rodriguez | A61K 8/738 |
| | | | 424/63 |
| 2010/0047200 A1* | 2/2010 | Luukas | A61K 8/0229 |
| | | | 424/64 |
| 2010/0230650 A1* | 9/2010 | Nagoh | C08F 2/44 |
| | | | 252/586 |
| 2012/0225996 A1 | 9/2012 | Kawato et al. | |
| 2012/0316278 A1* | 12/2012 | Inoue | C08G 83/007 |
| | | | 524/413 |
| 2013/0015416 A1* | 1/2013 | Takenaka | C08F 2/48 |
| | | | 252/582 |
| 2013/0215488 A1 | 8/2013 | Hiraren et al. | |
| 2014/0043586 A1* | 2/2014 | Hiraren | C09K 9/02 |
| | | | 351/159.61 |
| 2014/0107314 A1* | 4/2014 | Kawato | C08G 18/7642 |
| | | | 528/226 |
| 2014/0340727 A1 | 11/2014 | Mori et al. | |
| 2015/0301227 A1* | 10/2015 | Ryu | C09K 9/02 |
| | | | 351/159.61 |
| 2016/0222285 A1* | 8/2016 | Shimizu | C09K 9/02 |
| 2018/0030341 A1* | 2/2018 | Shimizu | C09K 9/02 |

FOREIGN PATENT DOCUMENTS

| | | |
|---|---|---|
| JP | 8-036200 A | 2/1996 |
| JP | 2003-048942 A | 2/2003 |
| JP | 2003-245899 A | 9/2003 |
| JP | 2012-052091 A | 3/2012 |
| WO | WO 98/03890 A1 | 1/1998 |
| WO | WO 2004/060951 A1 | 7/2004 |
| WO | WO 2009/075388 A1 | 6/2009 |
| WO | WO 2011/055540 A1 | 5/2011 |
| WO | WO 2011/125956 A1 | 10/2011 |
| WO | WO 2012/144460 A1 | 10/2012 |
| WO | WO 2012/176439 A1 | 12/2012 |
| WO | WO 2013/099640 A1 | 7/2013 |
| WO | WO 2014/084339 A1 | 6/2014 |

OTHER PUBLICATIONS

International Search Report (PCT/ISA/210) issued in PCT/JP2016/057884, dated Jun. 14, 2016.

Written Opinion (PCT/ISA/237) issued in PCT/JP2016/057884, dated Jun. 14, 2016.

Extended European Search Report, dated Oct. 2, 2018, for European Application No. 16761875.0.

* cited by examiner

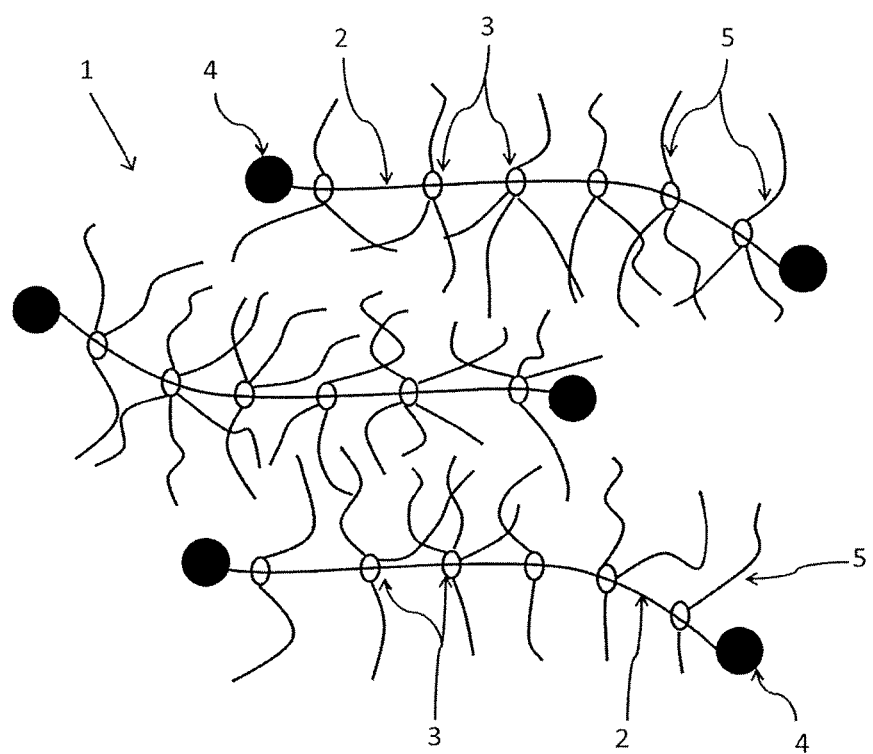

PROCESS FOR PRODUCING A PHOTOCHROMIC CURED BODY

TECHNICAL FIELD

The present invention relates to a process for producing a novel photochromic cured body.

BACKGROUND ART

Photochromic compounds typified by chromene compounds, fulgide compounds and spirooxazine compounds have a characteristic feature (photochromic properties) that they change their colors swiftly upon exposure to light including ultraviolet light such as sunlight or light from a mercury lamp and return to their original colors when they are put in the dark by stopping their exposure to light and are used for various purposes, especially optical materials, making use of this characteristic feature.

For example, photochromic spectacle lenses which are provided with photochromic properties by using a photochromic compound function as sunglasses which are quickly colored outdoors where they are irradiated with light including ultraviolet light such as sunlight and as ordinary transparent eyeglasses which are faded indoors where there is no irradiation, and demand for the photochromic spectacle lenses is growing nowadays.

To provide photochromic properties to an optical material, a photochromic compound is generally used in combination with a plastic material. Stated more specifically, the following means are known.
(a) A method in which a photochromic compound is dissolved in a compound and the compound is polymerized to directly mold an optical material such as a lens. This method is called "kneading method".
(b) A method in which a resin layer containing a photochromic compound dispersed therein is formed on the surface of a plastic molded article such as a lens by coating or cast polymerization. This method is called "lamination method".
(c) A method in which two optical sheets are bonded together by means of an adhesive layer formed of an adhesive resin containing a photochromic compound dispersed therein. This method is called "binder method".

For optical materials such as optical articles provided with photochromic properties, the following properties are further required.
(I) The degree of coloration ata visible light range before ultraviolet light is applied (initial coloration) should be low.
(II) The degree of coloration upon exposure to ultraviolet light (color optical density) should be high.
(III) The speed from the stoppage of the application of ultraviolet light to the time when the material returns to its original state (fading speed) should be high.
(IV) The repeat durability of a reversible function between color development and fading should be high.
(V) Storage stability should be high.
(VI) The material should be easily molded into various shapes.
(VII) Photochromic properties should be provided without the degradation of mechanical strength.

For the manufacture of optical materials having photochromic properties by the above-described means (a) to (c), various proposals have been made to satisfy the above requirements. As for color optical density and fading speed, it is now desired that more excellent photochromic properties should be developed.

For example, the above-described kneading method has an advantage that photochromic plastic lenses can be mass-produced at a low cost by using glass molds, and most of photochromic plastic lenses are now manufactured by this method.

However, as strength is required for a lens substrate in the kneading method, it is necessary to enhance the mechanical strength of a matrix resin containing a photochromic compound dispersed therein. Therefore, it is difficult to develop excellent photochromic properties. That is, since the degree of freedom of the molecule of the photochromic compound existent in the matrix resin becomes low, a photochromic reversible reaction is impaired.

For example, as for this kneading method, WO2012/176439 and WO2014/084339 disclose a technique for adding a photochromic compound to a monomer composition comprising a polyisocyanate monomer and a poly(thi)ol monomer. Although photochromic lenses molded by polymerizing and curing these compositions have very high mechanical strength as they have a (thio)urethane bond, the degree of freedom of the photochromic compound is significantly reduced due to the existence of the hard segment of the (thio)urethane bond and therefore the lenses are unsatisfactory in terms of photochromic properties. WO2009/075388 discloses a photochromic curable composition comprising a specific (meth)acrylic polymerizable monomer composition and a photochromic compound. Although a photochromic lens molded by polymerizing and curing these compositions develops high photochromic properties while it has high mechanical strength, its mechanical strength is lower than that of a (thio)urethane lens and there is still room for the improvement of photochromic properties. Further, these (meth)acrylic lenses have a problem that it is difficult to improve their refractive indices.

Meanwhile, in the lamination method, as compared with the above-described kneading method, since photochromic properties are developed with a thin layer formed on the surface of a substrate, to develop the same color optical density as that of the kneading method, a photochromic compound must be dissolved in a high concentration. In this case, according to the type of a photochromic compound, there occurs a problem such as unsatisfactory solubility or precipitation during storage. Further, since the layer which develops photochromic properties is thin, the photochromic compound may be inferior in durability.

WO2011/125956 discloses that a photochromic curable composition is applied to a plastic lens by spin coating and optically cured to form a photochromic coating layer (this lamination method is also called "coating method"). Then, since photochromic properties are developed with a thin layer comprising a photochromic compound in all examples of WO2011/125956, when a photochromic compound having low solubility is used, color optical density tends to become low and further, the photochromic compound may be inferior in durability.

Thus, either one of color optical density and fading speed is apt to become unsatisfactory in the currently known technologies.

DISCLOSURE OF THE INVENTION

Problem to Be Solved by the Invention

It is therefore an object of the present invention to provide a process for producing a photochromic cured body, which can provide excellent photochromic properties including color optical density and fading speed. It is another object of the present invention to provide a photochromic composition capable of forming a photochromic cured body having excellent mechanical properties and moldability in addition to photochromic properties.

Other objects and advantages of the present invention will become apparent from the following description.

Means for Solving the Problem

The inventors of the present invention conducted intensive studies to solve the above problems and succeeded in solving the problems by using a photochromic compound in combination with a polyiso(thio)cyanate compound, a poly(thi)ol and a mono(thi)ol compound having one hydroxyl group or thiol group in one molecule.

According to the present invention, there is provided a process for producing a photochromic cured body by curing a photochromic composition comprising (A) a polyiso(thio)cyanate compound having at least two isocyanate groups and/or isothiocyanate groups in one molecule, (B) a poly(thi)ol compound having at least two hydroxyl groups and/or thiol groups in one molecule, (C) a mono(thi)ol compound having one hydroxyl group or thiol group in one molecule and (D) a photochromic compound.

The above photochromic composition of the present invention can take the following preferred modes.

(1) The photochromic composition comprises a mixture of a premixture of the component (A) and the component (D) and a premixture of the component (B) and the component (C), or a mixture of a premixture of the component (B), the component (C) and the component (D), and the component (A).
(2) The photochromic composition comprises 2 to 40 parts by mass of the component (C) based on 100 parts by mass of the total of the components (A), (B) and (C).
(3) The photochromic composition further comprises (E) a polyrotaxane having a composite molecular structure composed of an axial molecule and a plurality of cyclic molecules clathrating the axial molecule.
(4) The cyclic molecules of the above polyrotaxane are cyclodextrin rings.
(5) The axial molecule of the above polyrotaxane has a chain structure having a bulky group at both ends, the chain part is formed of polyethylene glycol, and the bulky group at both ends is an adamantyl group.
(6) A side chain is introduced into at least part of the ring contained in each of the cyclic molecules.
(7) The above side chain is formed by repeating an organic chain having 3 to 20 carbon atoms a plurality of times.
(8) A polymerizable functional group is introduced into the above side chain.
(9) The above polymerizable functional group is an epoxy group, OH group, SH group, $NH_2$ group, episulfide group, thietanyl group, NCO group or NCS group.
(10) Any one of the photochromic compositions (3) to (9) comprises a mixture of a premixture of the component (A) and the component (D) and a premixture of the component (B), the component (C) and the component (E), or a mixture of a premixture of the component (B), the component (C), the component (D) and the component (E), and the component (A).

According to the present invention, there is provided a photochromic cured body obtained by curing the above photochromic composition.

BRIEF DESCRIPTION OF THE DRAWINGS

FIG. 1 is a schematic diagram of the molecular structure of a polyrotaxane used in the present invention.

BEST MODE FOR CARRYING OUT THE INVENTION

The photochromic composition of the present invention comprises (A) a polyiso(thio)cyanate compound having at least two isocyanate groups and/or isothiocyanate groups in one molecule, (B) a poly(thi)ol compound having at least two hydroxyl groups and/or thiol groups in one molecule, (C) a mono(thi)ol compound having one hydroxyl group or thiol group in one molecule and (D) a photochromic compound and, according to the type of use, further comprises (E) a polyrotaxane having a composite molecular structure composed of an axial molecule and a plurality of cyclic molecules clathrating the axial molecule and other known compounding agents.

A description is first given of the polyiso(thio)cyanate compound having at least two isocyanate groups and/or isothiocyanate groups in one molecule (A).

<(A) polyiso(thio)cyanate Compound Having at Least Two Isocyanate Groups and/or Isothiocyanate Groups in One Molecule>

The polyiso(thio)cyanate compound having at least two isocyanate groups and/or isothiocyanate groups in one molecule (may also be simply referred to as "polyiso(thio) cyanate compound" hereinafter) constituting the photochromic composition of the present invention is a compound having at least two isocyanate groups and/or isothiocyanate groups in a polyiso(thio)cyanate compound. Examples of the polyisocyanate compound out of the polyiso(thio)cyanate compounds include aliphatic isocyanates, alicyclic isocyanates, aromatic isocyanates, sulfur-containing aliphatic isocyanates, aliphatic sulfide-based isocyanates, aromatic sulfide-based isocyanates, aliphatic sulfone-based isocyanates, aromatic sulfone-based isocyanates, sulfonic acid ester-based isocyanates, aromatic sulfonic acid amide-based isocyanates and sulfur-containing heterocyclic isocyanates.

Examples of the polyisothiocyanate compound include aliphatic isothiocyanates, alicyclic isothiocyanates, aromatic isothiocyanates, heterocycle-containing isothiocyanates, sulfur-containing aliphatic isothiocyanates, sulfur-containing aromatic isothiocyanates and sulfur-containing heterocyclic isothiocyanates. Specific examples of these polyiso(thio)cyanate compounds are given below.

Aliphatic isocyanates; ethylene diisocyanate, trimethylene diisocyanate, tetramethylene diisocyanate, hexamethylene diisocyanate, octamethylene diisocyanate, nanomethylene diisocyanate, 2,2'-dimethylpentane diisocyanate, 2,2,4-trimethylhexamethylene diisocyanate, decamethylene diisocyanate, butene diisocyanate, 1,3-butadiene-1,4-diisocyanate, 2,4,4-trimethylhexamethylene diisocyanate, 1,6,11-trimethylundecamethylene diisocyanate, 1,3,6-trimethylhexamethylene diisocyanate, 1,8-diisocyanato-4-isocyanatomethyl octane, 2,5,7-trimethyl-1,8-diisocyanato-5-isocyanatomethyl octane, bis(isocyanatoethyl)carbonate, bis(isocyanatoethyl)ether, 1,4-butylene glycol dipropyl ether-ω,ω'-diisocyanate, lysine diisocyanatomethyl ester, lysine triisocyanate, 2-isocyanatoethyl-2,6-diisocyanato hexanoate and 2-isocyanatopropyl-2,6-diisocyanato hexanoate Alicyclic isocyanates; isophorone diisocyanate, (bicyclo[2.2.1]heptane-2,5-diyl)bismethylene diisocyanate, (bicyclo[2.2.1]heptane-2,6-diyl)bismethylene diisocyanate, 2β,5α- bis(isocyanato)norbornane, 2β,5β-bis(isocyanato) norbornane, 2β,6α-bis(isocyanato)norbornane, 2β,6β-bis (isocyanato)norbornane, 2,6-di(isocyanatomethyl)furan, bis (isocyanatomethyl)cyclohexane, dicyclohexylmethane diisocyanate, 4,4-isopropylidenebis(cyclohexyl isocyanate), cyclohexane diisocyanate, methylcyclohexane diisocyanate, dicyclohexyl dimethylmethane diisocyanate, 2,2'-dimethyl dicyclohexylmethane diisocyanate, bis(4-isocyanato-n-butylidene)pentaerythritol, dimeric acid diisocyanate, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-5-(2-isocyanatoethyl)-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane, 2-isocyanatomethyl-2-(3-isocyanatopropyl)-6-(2-isocyanatoethyl)-bicyclo[2.2.1]-heptane, 2,5-bis(isocyanatomethyl)-bicyclo[2.2.1]-heptane, 2,6-bis(isocyanatomethyl)-bicyclo[2.2.1]-heptane, 1,3,5-tris (isocyanatomethyl)cyclohexane, 3,8-bis(isocyanatomethyl) tricyclodecane, 3,9-bis(isocyanatomethyl)tricyclodecane, 4,8-bis(isocyanatomethyl)tricyclodecane, 4,9-bis(isocyanatomethyl)tricyclodecane, 1,5-diisocyanato decalin, 2,7-diisocyanto decalin, 1,4-diisocyanato decalin, 2,6-diisocyanato decalin, a mixture of bicyclo[4.3.0]nonane-3,7-diisocyanate and bicyclo[4.3.0]nonane-4,8-diisocyanate, a mixture of bicyclo[2.2.1]heptane-2,5-diisocyanate and bicyclo[2.2.1]heptane-2,6-diisocyanate, a mixture of bicyclo[2.2.2]otane-2,5-diisocyanate and bicyclo[2.2.2]octane-2,6-diisocyanate, and a mixture of tricyclo[5.2.1.0$^{2,6}$]decane-3,8-diisocyanate and tricyclo[5.2.1.0$^{2,6}$]decane-4,9-diisocyanate.

Aromatic isocyanates; xylylene diisocyanate (o-, m-, p-), tetrachloro-m-xylylene diisocyanate, 4-chloro-m-xylylene diisocyanate, 4,5-dichloro-m-xylylene diisocyanate, 2,3,5,6-tetrabromo-p-xylylene diisocyanate, 4-methyl-m-xylylene diisocyanate, 4-ethyl-m-xylylene diisocyanate, bis(isocyanatoethyl)benzene, bis(isocyanatopropyl)benzene, 1,3-bis(α,α-dimethylisocyanatomethyl)benzene, 1,4-bis(α,α-dimethylisocyanatomethyl)benzene, α,α,α',α'-tetramethylxylylene diisocyanate, bis(isocyanatobutyl) benzene, bis(isocyanatomethyl)naphthalene, bis (isocyanatomethyl)diphenyl ether, bis(isocyanatoethyl) phthalate, mesitylene triisocyanate, 2,6-di (isocyanatomethyl)furan, phenylene diisocyanate, tolylene diisocyanate, ethyl phenylene diisocyanate, isopropyl phenylene diisocyanate, dimethyl phenylene diisocyanate, diethyl phenylene diisocyanate, diisopropyl phenylene diisocyanate, trimethylbenzene triisocyanate, benzene triisocyanate, 1,3,5-triisocyanatomethyl benzene, naphthalene diisocyanate, methyl naphthalene diisocyanate, biphenyl diisocyanate, tolidine diisocyanate, 4,4'-diphenylmethane diisocyanate, 3,3'-dimethyldiphenylmethane-4,4'-diisocyanate, bibenzyl-4,4'-diisocyanate, bis(isocyanatophenyl)ethylene, 3,3'-dimethoxybiphenyl-4,4'-diisocyanate, triphenylmethane triisocyanate, polymeric MDI, naphthalene triisocyanate, diphenylmethane-2,4,4'-triisocyanate, 3-methyldiphenylmethane-4,4',6-triisocyanate, 4-methyl-diphenylmethane-2,3,4',5,6-pentaisocyanate, phenyl isocyanatomethyl isocyanate, phenyl isocyanatoethyl isocyanate, tetrahydronaphthylene diisocyanate, hexahydrobenzene diisocyanate, hexahydrodiphenylmethane-4,4'-diisocyanate, diphenyl ether diisocyanate, ethylene glycol diphenyl ether diisocyanate, 1,3-propylene glycol diphenyl ether diisocyanate, benzophenone diisocyanate, diethylene glycol diphenyl ether diisocyanate, dibenzofuran diisocyanate, carbazole diisocyanate, ethyl carbazole diisocyanate and dichlorocarbazole diisocyanate Sulfur-containing aliphatic isocyanates; thiodiethyl diisocyanate, thiodipropyl diisocyanate, thiodihexyl diisocyanate, dimethyl sulfone diisocyanate, dithiodimethyl diisocyanate, dithiodiethyl diisocyanate, 1-isocyanatomethylthio-2,3-bis(2-isocyanatoethylthio) propane, 1,2-bis(2-isocyanatoethylthio)ethane, 1,1,2,2-tetrakis (isocyanatomethylthio)ethane, 2,2,5,5-tetrakis(isocyanatomethylthio)-1,4-dithiane, 2,4-dithiapentane-1,3-diisocyanate, 2,4,6-trithiaheptane-3,5-diisocyanate, 2,4,7,9-tetrathiapentane-5,6-diisocyanate, bis (isocyanatomethylthio)phenyl methane, bis (isocyanatomethylthio)methane, bis(isocyanatoethylthio) methane, bis(isocyanatoethylthio)ethane, bis (isocyanatomethylthio)ethane and 1,5-isocyanato2-isocyanatomethyl-3-thiapentane Aliphatic sulfide-based isocyanates; bis[2-(isocyanatomethylthio)ethyl]sulfide, dicyclohexyl sulfide-4,4'-diisocyanate, bis(isocyanatomethyl)sulfide, bis(isocyanatoethyl)sulfide, bis(isocyanatopropyl)sulfide, bis(isocyanatohexyl) sulfide, bis(isocyanatomethyl)disulfide, bis (isocyanatoethyl)disulfide and bis(isocyanatopropyl) disulfide Aromatic sulfide-based isocyanates; diphenyl sulfide-2,4'-diisocyanate, diphenyl sulfide-4,4'-diisocyanate, 3,3'-dimethoxy-4,4'-diisocyanatodibenzyl thioether, bis(4-isocyanatomethylbenzene)sulfide, 4,4'-methoxybenzene thioethylene glycol-3,3'-diisocyanate, diphenyl disulfide-4,4'-diisocyanate, 2,2'-dimethyl diphenyl disulfide-5,5'-diisocyanate, 3,3'-dimethyl diphenyl disulfide-5,5'-diisocyanate, 3,3'-dimethyl diphenyl disulfide-6,6'-diisocyanate, 4,4'-dimethyl diphenyl disulfide-5,5'-diisocyanate, 3,3'-dimethoxy diphenyl disulfide-4,4'-diisocyanate and 4,4'-dimethoxydiphenyl disulfide-3,3'-diisocyanate Aliphatic sulfone-based isocyanates; bis(isocyanatomethyl)sulfone Aromatic sulfone-based isocyanates; diphenyl sulfone-4,4'-diisocyanate, diphenyl sulfone-3,3'-diisocyanate, benzylidene sulfone-4,4'-diisocyanate, diphenylmethane sulfone-4,4'-diisocyanate, 4-methyl diphenylmethane sulfone-2,4'-diisocyanate, 4,4'-dimethoxydiphenyl sulfone-3,3'-diisocyanate, 3,3'-dimethoxy-4,4'-diisocyanatodibenzyl sulfone, 4,4'-dimethyldiphenyl sufone-3,3'-diisocyanate, 4,4'-di-tert-butyldiphenyl sulfone-3,3'-diisocyanate, 4,4'-dimethoxybenzene ethylene disulfone-3,3'-diisocyanate and 4,4'-dichlorodiphenyl sulfone-3,3'-diisocyanate Sulfonic acid ester-based isocyanates; 4-methyl-3-isocyanatobenzene sulfonyl-4'-isocyanatophenol ester, 4-methoxy-3-isocyanatobenzene sulfonyl-4'-isocyanatophenol ester Aromatic sulfonic acid amide-based isocyanates; 4-methyl-3-isocyanatobenzene sulfonylanilide-3'-methyl-4'-isocyanate, dibenzene sulfonyl-ethylenediamine-4,4'-diisocyanate, 4,4'-dimethoxybenzene sulfonyl-ethylenediamine-3,3'-diisocyanate and 4-methyl-3-isocyanatobenzene sulfonylanilide-4-methyl-3'-isocyanate Sulfur-containing heterocyclic isocyanates; thiophene-2,5-diisocyanate, thiophene-2,5-diisocyanato methyl, 1,4-dithiane-2,5-diisocyanate, 1,4-dithiane-2,5-diisocyanato methyl, 1,3-dithiolane-4,5-diisocyanate, 1,3-dithiolane-4,5-diisocyanato methyl, 1,3-dithiolane-2-methyl-4,5-diisocyanato methyl, 1,3-dithiolane-2,2-diisocyanato ethyl, tetrahydrothiophene-2,5-diisocyanate, tetrahydrothiophene-2,5- diisocyanato methyl, tetrahydrothiophene-2,5-diisocyanto ethyl, tetrahydrothiophene-3,4-diisocyanto methyl, tricyclothiaoctane diisocyanate, 2-(1,1-diisocyanatomethyl)thiophene, 3-(1,1-diisocyanatomethyl)thiophene, 2-(2-thienylthio)-1,2-diisocyanato propane, 2-(3-thienylthio)-1,2-diisocyanato propane, 3-(2-thienyl)-1,5-diissocyanato-2,4-dithiapentane, 3-(3-thienyl)-1,5-diisocyanato-2,4-dithiapentane, 3-(2-thienylthio)-1,5-diisocyanato-2,4-dithiapentane, 3-(3-thienylthio)-1,5-diisocyanato-2,4-dithiapentane, 3-(2-thienylthiomethyl)-1,5-diisocyanato-2,4-dithiapentane, 3-(3-thienylthiomethyl)-1,5-diisocyanato-2,4-dithiapentane, 2,5-(diisocyanatomethyl)thiophene, 2,3-(diisocyanatomethyl)thiophene, 2,4-(diisocyanatomethyl)thiophene, 3,4-(diisocyanatomethyl)thiophene, 2,5-(diisocyanatomethylthio)thiophene, 2,3-(diisocyanatomethylthio)thiophene, 2,4-(diisocyanatomethylthio)thiophene, 3,4-(diisocyanatomethylthio)thiophene and 2,4-bisisocyanatomethyl-1,3,5-trithiane.

Further, halogen substitutes, alkyl substitutes, alkoxy substitutes and nitro substitutes, polyhydric alcohol prepolymer type modified products, carbodiimide modified products, urea modified products and biuret modified products, and dimerization and trimerization reaction products of the above polyisocyanates may also be used.

Aliphatic isothiocyanates; 1,2-diisothiocyanato ethane, 1,3-diisothiocyanato propane, 1,4-diisothiocyanato butane, 1,6-diisothiocyanato hexane and p-phenylene diisopropylidene diisothiocyanate Alicyclic isothiocyanates; cyclohexyl isothiocyanate, cyclohexane diisothiocyanate, 2,4-bis(isothiocyanatomethyl)norbornane, 2,5-bis(isothiocyanatomethyl)norbornane, 3,4-bis(isothiocyanatomethyl)norbornane and 3,5-bis(isothiocyanatomethyl)norbornane Aromatic isothiocyanates; phenyl isothiocyanate, 1,2-diisothiocyanato benzene, 1,3-diisothiocyanato benzene, 1,4-diisothiocyanato benzene, 2,4-diisothiocyanato toluene, 2,5-diisothiocyanato-m-xylene diisocyanate, 4,4'-diisothiocyanato-1,1'-biphenyl, 1,1'-methylenebis(4-isothiocyanatobenzene), 1,1'-methylenebis(4-isothiocyanato2-methylbenzene), 1,1'-methylenebis(4-isothiocyanato3-methylbenzene), 1,1'-(1,2-ethanediyl)bis(4-isothiocyanatobenzene), 4,4'-diisothiocyanato benzophenone, 4,4'-diisothiocyanato-3,3'-dimethyl benzophenone, benzanilide-3,4'-diisothiocyanate, diphenyl ether-4,4'-diisothiocyanate and diphenylamine-4,4'-diisothiocyanate Heterocycle-containing isothiocyanates; 2,4,6-triisothiocyanato-1,3,5-triazine Carbonyl isothiocyanates; hexanedioyl diisothiocyanate, nonanedioyl diisothiocyanate, carbonic diisothiocyanate, 1,3-benzene dicarbonyl diisothiocyanate, 1,4-benzene dicarbonyl diisothiocyanate and (2,2'bipyridine)-4,4'-dicarbonyl diisothiocyanate Further, polyfunctional isothiocyanates having at least one sulfur atom in addition to the sulfur atom of an isothiocyanate group may also be used. Examples of the polyfunctional isothiocyanates are given below.

Sulfur-containing aliphatic isothiocyanates; thiobis(3-isothiocyanatopropane), thiobis(2-isothiocyanatoethane) and dithiobis(2-isothiocyanatoethane)

Sulfur-containing aromatic isothiocyanates; 1-isothiocyanato4-{(2-isothiocyanato)sulfonyl}benzene, thiobis(4-isothiocyanatobenzene), sulfonyl bis(4-isothiocyanatobenzene), sulfinyl bis(4-isothiocyanatobenzene), dithiobis(4-isothiocyanatobenzene), 4-isothiocyanato-1-{(4-isothiocyanatophenyl)sulfonyl}-2-methoxy-benzene, 4-methyl-3-isothiocyanatobenzene sulfonyl-4'-isothiocyanatophenyl ester and 4-methyl-3-isothiocyanatobenzene sulfonylanilide-3'-methyl-4'-isothiocyanate Sulfur-containing heterocyclic isothiocyanates; thiophene-2,5-diisothiocyanate and 1,4-dithiane-2,5-diisothiocyanate <Preferred Examples of Component (A)>

Preferred examples of the polyiso(thio)cyanate compound as the above component (A) include pentamethylene diisocyanate, hexamethylene diisocyanate, heptamethylene diisocyanate, octamethylene diisocyanate, isophorone diisocyanate, norbornane diisocyanate, 2,5-bis(isocyanatomethyl)-bicyclo[2.2.1]-heptane, 2,6-bis(isocyanatomethyl)-bicyclo[2.2.1]-heptane, 1,2-bis(2-isocyanatoethylthio)ethane, xylene diisocyanate (o-, m-, p-), 2,4-tolylene diisocyanate, 2,6-tolylene diisocyanate, 4,4'-diphenylmethane diisocyanate and mixtures thereof.

A description is subsequently given of the poly(thi)ol compound having at least two hydroxyl groups and/or thiol groups in one molecule (B).

<(B) Poly(thi)ol Compound Having at Least Two Hydroxyl Groups and/or Thiol Groups in One Molecule>

The poly(thi)ol compound having at least two hydroxyl groups and/or thiol groups in one molecule constituting the photochromic composition of the present invention (may also be simply referred to as "poly(thi)ol compound" hereinafter) is a compound having at least two hydroxyl groups (OH groups) and/or thiol group (SH groups) in a poly(thi)ol compound. Typical examples of the polyol compound out of the poly(thi)ol compounds include di-, tri-, tetra-, penta- and hexa-hydroxy compounds, polyesters containing at least two OH groups in one molecule (polyester plyols), polyethers containing at least two OH groups in one molecules (to be referred to as "polyether polyols" hereinafter), polycarbonates containing at least two OH groups in one molecules (polycarbonate polyols), polycaprolactones containing at least two OH groups in one molecule (polycaprolactone polyols) and acrylic polymers containing at least two OH groups in one molecule (polyacrylic polyols).

Examples of the polythiol compound include aliphatic polythiols, aromatic polythiols, halogen-substituted aromatic polythiols, heterocycle-containing polythiols, aromatic polythiols containing a sulfur atom in addition to a mercapto group, aliphatic polythiols containing a sulfur atom in addition to a mercapto group and heterocycle-containing polythiols containing a sulfur atom in addition to a mercapto group. Specific examples of these compounds are given below.

Aliphatic alcohols; ethylene glycol, diethylene glycol, propylene glycol, dipropylene glycol, butylene glycol, 1,5-dihydroxypentane, 1,6-dihydroxyhexane, 1,7-dihydroxyheptane, 1,8-dihydroxyoctane, 1,9-dihydroxynonane, 1,10-dihydroxydecane, 1,11-dihydroxyundecane, 1,12-dihydroxydodecane, neopentyl glycol, glycerin, trimethylolethane, trimethylolpropane, ditrimethylolpropane, glyceryl monooleate, monoelaidin, sucrose, trimethylolpropane tripolyoxyethylene ether (such as TMP-30, TMP-60 and TMP-90 of Nippon Nyukazai Co., Ltd.), trimethylolpropane polyoxyethylene ether, butane triol, 1,2-methyl glycoside, pentaerythritol, dipentaerythritol, tripentaerythritol, sorbitol, erythritol, threitol, ribitol, arabinitol, xylitol, allitol, mannitol, dorcitol, iditol, glycol, inositol, hexane triol, triglycerol, diglycerol, triethylene glycol, polyethylene glycol, tris(2-hydroxyethyl)isocyanurate, cyclobutanediol, cyclopentanediol, cyclohexanediol, cycloheptanediol, cyclooctanediol, cyclohexanedimethanol, hydroxypropyl cyclohexanol, tricyclo[5.2.1.0$^{2,6}$]decane-dimethanol, bicyclo[4.3.0]-nonanediol, dicyclohexanediol, tricyclo[5.3.1.1$^{3,9}$]dodecanediol, bicyclo[4.3.0]nonanedimethanol, tricyclo[5.3.1.1$^{3,9}$]dodecane-diethanol, hydroxypropyl tricyclo[5.3.1.1$^{3,9}$]dodecanol, spiro[3,4]octanediol, butyl cyclohexanediol, 1,1'-bicyclohexylidene diol, cyclohexane triol, maltitol, lactitol, 3-methyl-1,5-dihydroxypentane, dihydroxyneopentyl, 2-ethyl-1,2-dihydroxyhexane, 2-methyl-1,3-dihydroxypropane, 1,4-cyclohexane dimethanol, 1,3-cyclohexane dimethanol, 1,2-cyclohexane dimethanol o-dihydroxy xylylene, m-dihydroxy xylylene, p-dihydroxy xylylene, 1,4-bis(2-hydroxyethyl)benzene, 1,4-bis(3-hydroxypropyl)benzene, 1,4-bis(4-hydroxybutyl)benzene, 1,4-bis(5-hydroxypentyl)benzene, 1,4-bis(6-hydroxyhexyl)benzene, 2,2-bis[4-(2''-hydroxyethyloxy)phenyl])propane, glyceryl monooleate, monoelaidin and dimethylol propane Aromatic alcohols; dihydroxy naphthalene, trihydroxy naphthalene, tetrahydroxy naphthalene, dihydroxy benzene, benzene triol, biphenyl tetraol, pyrogallol, (hydroxynaphthyl)pyrogallol, trihydroxy phenanthrene, bisphenol A, bisphenol F, xylylene glycol, tetrabromobisphenol A, bis(4-hydroxyphenyl)methane, 1,1-bis(4-hydorxyphenyl)ethane, 1,2-bis(4-hydroxyphenyl)ethane, bis(4-hydroxyphenyl)phenyl methane, bis(4-hydroxyphenyl)diphenyl methane, bis(4-hydroxyphenyl)-1-naphthyl methane, 1,1-bis(4-hydroxyphenyl)-1-phenyl ethane, 2-(4-hydroxyphenyl)-2-(3-hydroxyphenyl)propane, 2,2-bis(4-hydroxyphenyl)butane, 1,1-bis(4-hydroxyphenyl)butane, 2,2-bis(4-hydroxyphenyl)-3-methyl butane, 2,2-bis(4-hydroxyphenyl)pentane, 3,3-bis(4-hydroxyphenyl)pentane, 2,2-bis(4-hydroxyphenyl)hexane, 2,2-bis(4-hydroxyphenyl)octane, 2,2-bis(4-hydroxyphenyl)-4-methyl pentane, 2,2-bis(4-hydroxyphenyl)heptane, 4,4-bis(4-hydroxyphenyl)heptane, 2,2-bis(4-hydroxyphenyl)tridecane, 2,2-bis(4-hydroxyphenyl)octane, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-tert-butyl-4-hydroxyphenyl)propane, 2,2-bis(3-cyclohexyl-4-hydroxyphenyl)propane, 2,2-bis(3-allyl-4'-hydroxyphenyl)propane, 2,2-bis(3-methoxy-4-hydroxyphenyl)propane, 2,2-bis(3,5-dimethyl-4-hydroxyphenyl)propane, 2,2-bis(2,3,5,6-tetramethyl-4-hydroxyphenyl)propane, bis(4-hydroxyphenyl)cyanomethane, 1-cyano-3,3-bis(4-hydroxyphenyl)butane, 2,2-bis(4-hydroxyphenyl)hexafluoropropane, 1,1-bis(4-hydroxyphenyl)cyclopentane, 1,1-bis(4-hydroxyphenyl)cyclohexane, 1,1-bis(4-hydroxyphenyl)cycloheptane, 1,1-bis(3-methyl-4-hydorxyphenyl)cyclohexane, 1,1-bis(3,5-dimethyl-4-hydroxyphenyl)cyclohexane, 1,1-bis(3,5-dichloro-4-hydroxyphenyl)cyclohexane, 1,1-bis(3-methyl-4-hydroxyphenyl)-4-methyl cyclohexane, 1,1-bis(4-hydroxyphenyl)-3,3,5-trimethyl cyclohexane, 2,2-bis(4-hydroxyphenyl)norbornane, 2,2-bis(4-hydroxyphenyl)adamantane, 4,4'-dihydroxydiphenyl ether, 4,4'-dihydroxy-3,3'-dimethyldiphenyl ether, ethylene glycol bis(4-hydroxyphenyl)ether, 4,4'-dihydroxydiphenyl sulfide, 3,3'-dimethyl-4,4'-dihydroxydiphenyl sulfide, 3,3'-dicyclohexyl-4,4'-dihydroxydiphenyl sulfide, 3,3'-diphenyl-4,4'-dihydroxydiphenyl sulfide,4,4'-dihydroxdiphenyl sulfoxide, 3,3'-dimethyl-4,4'-dihydroxydiphenyl sulfoxide, 4,4'-dihydroxidiphenyl sulfone, 4,4'-dihydroxy-3,3'-dimethyldiphenyl sulfone, bis(4-hydroxyphenyl)ketone, bis(4-hydroxy-3-methylphenyl)ketone, 7,7'-dihydroxy-3,3',4,4'-tetrahydro-4,4,4',4'-tetramethyl-2,2'-spirobi(2H-1-benzopyran), trans-2,3-bis(4-hydroxyphenyl)-2-butene, 9,9-bis(4-hydroxyphenyl)fluorene, 3,3-bis(4-hydroxyphenyl)-2-butanone, 1,6-bis(4-hydroxyphenyl)-1,6-hexanedione, 4,4'-dihydroxybiphenyl and hydroquinone resorcin Sulfur-containing polyols; bis-[4-(hydroxyethoxy)phenyl]sulfide, bis-[4-(2-hydroxypropoxy)phenyl sulfide, bis-[4-(2,3-dihydroxypropoxy)phenyl]sulfide, bis-[4-(4-hydroxycyclohexyloxy)phenyl]sulfide, bis-[2-methyl-4-(hydroxyethoxy)-6-butylphenyl]sulfide, compounds obtained by adding an average of three or less molecules per hydroxyl group of ethylene oxide and/or propylene oxide to the above sulfur-containing polyols, di-(2-hydroxyethyl)sulfide, bis(2-hydroxyethyl)disulfide, 1,4-dithiane-2,5-diol, bis(2,3-dihydroxypropyl)sulfide, tetrakis(4-hydroxy-2-thiabutyl)methane, bis(4-hydroxyphenyl)sulfone, tetrabromobisphenol S, tetramethylbisphenol S, 4,4'-thiobis(6-tert-butyl-3-methylphenol) and 1,3-bis(2-hydroxyethylthioethyl)-cyclohexane Sulfur-containing heterocyclic polyols; 2,5-bis(hydroxymethyl)-1,4-dithiane, 3-hydroxy-6-hydroxymethyl-1,5-dithiacycloheptane and 3,7-dihydroxy-1,5-dithiacyclooctane Polyester polyols; compounds obtained from a condensation reaction between a polyol and a polybasic acid Polyether polyols; compounds obtained from a reaction between a compound having at least two active hydrogen-containing groups in the molecule and an alkylene oxide, and modified products thereof Polycaprolactone polyols; compounds obtained by the ring-opening polymerization of E-caprolactone Polycarbonate polyols; compounds obtained by the phosgenation of at least one low-molecular weight polyol, and compounds obtained by transesterification using ethylene carbonate, diethyl carbonate or diphenyl carbonate Polyacrylic polyols; compounds obtained by the copolymerization of an acrylic acid ester or methacrylic acid ester containing a hydroxyl group and a monomer copolymerizable with these esters Aliphatic polythiols; methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, tetrakis(mercaptomethyl)methane, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, bicyclo[2,2,1]hepta-exo-cis-2,3-dithiol, 1,1-bis(mercaptomethyl)cyclohexane, thiomalic acid bis(2-mercaptoethyl ester), 2,3-dimercaptosuccinic acid (2-mercaptoethyl ester), 2,3-dimercapto-1-propanol(2-mercaptoacetate), 2,3-dimercapto-1-propanol(3-mercaptoacetate), diethylene glycol bis(2-mercaptoacetate), diethylene glycol bis(3-mercaptopropionate), 1,2-dimercaptopropylmethyl ether, 2,3-dimercaptopropylmethyl ether, 2,2-bis(mercaptomethyl)-1,3-propanedithiol, bis(2-mercaptoethyl) ether, ethylene glycol bis(2-mercaptoacetate), ethylene glycol bis(3-mercaptopropionate), 1,4-bis(3-mercaptobutyryloxy)butane, 1,4-butanediol bis(3-mercaptopropionate), 1,4-butanediol bis(thioglycolate) 1,6-hexanediol bis(thioglycolate), tetraethylene glycol bis(3-mercaptopropionate), trimethylolpropane tris(2-mercaptoacetate), trimethylolpropane tris(3-mercaptopropionate), trimethylolethane tris(3-mercaptobutyrate), trimethylolpropane tris(3-mercaptobutyrate), pentaerythritol tetrakis(2-mercaptoacetate), pentaerythritol tetrakis(3-mercaptopropionate), 1,2-bis(2-mercaptoethylthio)-3-mercaptopropane, dipentaerythritol hexakis(3-mercaptopropionate), pentaerythritol tetrakis(3-mercaptobutyrate), 1,4-bis(3-mercaptobutyryloxy)butane, trimethylolpropane tris(3-mercaptobutyrate), trimethylolethane tris(3-mercaptobutyrate), 1,2-bis[(2-mercaptoethyl) thio]-3-mercaptopropane, 2-meraptomethyl-1,3-propanedithiol, 2-mercaptomethyl-1,4-butanedithiol, 2,4,5-tris(mercaptomethyl)-1,3-dithiolane, 2,2-bis(mercaptomethyl)-

1,4-butanedithiol, 4,4-bis(mercaptomethyl)-3,5-dithiaheptane-1,7-dithiol, 2,3-bis(mercaptomethyl)-1,4-butanedithiol, 2,6-bis(mercaptomethyl)-3,5-dithiaheptane-1,7-dithiol, 4-mercaptomethyl-1,8-dimercapto-3,6-dithiaoctane, 2,5-bismercaptomethyl-1,4-dithiane, 1,1,3,3-tetrakis(mercaptomethylthio)propane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane and 4-mercaptomethyl-1,8-dimercapto-3,6-dithiaoctane Aromatic polythiols; 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2-bis(mercaptomethoxy)benzene, 1,3-bis(mercaptomethoxy)benzene, 1,4-bis(mercaptomethoxy)benzene, 1,2-bis(mercaptoethoxy)benzene, 1,3-bis(mercaptoethoxy)benzene, 1,4-bis(mercaptoethoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethoxy)benzene, 1,2,4-tris(mercaptomethoxy)benzene, 1,3,5-tris(mercaptomethoxy)benzene, 1,2,3-tris(mercaptoethoxy)benzene, 1,2,4-tris(mercaptoethoxy)benzene, 1,3,5-tris(mercaptoethoxy)benzene, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptoethyl)benzene, 1,2,3,5-tetrakis(mercaptomethoxy)benzene, 1,2,4,5-tetrakis(mercaptomethoxy)benzene, 1,2,3,4-tetrakis(mercaptoethoxy)benzene, 1,2,3,5-tetrakis(mercaptoethoxy)benzene, 1,2,4,5-tetrakis(mercaptoethoxy)benzene, 2,2'-dimercaptobiphenyl, 4,4'-dimercaptobiphenyl, 4,4'-dimercaptobibenzyl, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracene dimethanethiol, 1,3-di(p-methoxyphenyl)propane-2,2-dithiol, 1,3-diphenylpropane-2,2-dithiol, phenylmethane-1,1-dithiol, 2,4-di(p-mercaptophenyl)pentane and 1,4-bis(mercaptopropylthiomethyl)benzene Halogen substituted aromatic polythiols; 2,5-dichlorobenzene-1,3-dithiol, 1,3-di(p-chlorophenyl)propane-2,2-dithiol, 3,4,5-tribromo-1,2-dimercaptobenzene and 2,3,4,6-tetrachloro-1,5-bis(mercaptomethyl)benzene Heterocycle-containing polythiols; 2-methylamino-4,6-dithiol sym-triazine, 2-ethylamino-4,6-dithiol sym-triazine, 2-amino-4,6-dithiol sym-triazine, 2-morpholino-4,6-dithiol sym-triazine, 2-cyclohexylamino-4,6-dithiol sym-triazine, 2-methoxy-4,6-dithiol sym-triazine, 2-phenoxy-4,6-dithiol sym-triazine, 2-thiobenzeneoxy-4,6-dithiol sym-triazine, 2-thiobutyloxy-4,6-dithiol sym-triazine and 1,3,5-tris(3-mercaptobutyryloxyethyl)-1,3,5-triazine-2,4,6(1H,3H,5H)-trione Aromatic polythiols containing sulfur atom in addition to mercapto group; 1,2-bis(mercaptomethylthio)benzene, 1,3-bis(mercaptomethylthio)benzene, 1,4-bis(mercaptomethylthio)benzene, 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris(mercaptoethylthio)benzene, 1,2,3,4-tetrakis(mercaptomethylthio)benzene, 1,2,3,5-tetrakis(mercaptomethylthio)benzene, 1,2,4,5-tetrakis(mercaptomethylthio)benzene, 1,2,3,4-tetrakis(mercaptoethylthio)benzene, 1,2,3,5-tetrakis(mercaptoethylthio)benzene and 1,2,4,5-tetrakis(mercaptoethylthio)benzene Aliphatic polyols containing sulfur atom in addition to mercapto group; bis(mercaptomethyl)sulfide, bis(mercaptoethyl)sulfide, bis(mercaptopropyl)sulfide, bis(mercaptomethylthio)methane, bis(2-mercaptoethylthio)methane, bis(3-mercaptopropyl)methane, 1,2-bis(mercaptomethylthio)ethane, 1,2-(2-mercaptoethylthio)ethane, 1,2-(3-mercaptopropyl)ethane, 1,3-bis(mercaptomethylthio)propane, 1,3-bis(2-mercaptoethylthio)propane, 1,3-bis(3-mercaptopropylthio)propane, 1,2-bis(2-mercaptoethylthio)-3-mercaptopropane, 2-mercaptoethylthio-1,3-propanedithiol, 1,2,3-tris(mercaptomethylthio)propane, 1,2,3-tris(2-mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercapto-1,4-dithiane, bis(mercaptomethyl)disulfide, bis(mercaptoethyl)disulfide, bis(mercaptopropyl)disulfide, thioglycolic acid or mercaptopropionic acid esters of the above compounds, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxypropyl sulfide bis(2-mercaptoacetate), hydroxypropyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), hydroxypropyl disulfide bis(2-mercaptoacetate), hydroxypropyl disulfide bis(3-mercaptopropionate), 2-mercaptoethyl ether bis(2-mercaptoacetate), 2-mercaptoethyl ether bis(3-mercaptopropionate), 1,4-dithiane-2,5-diol bis(2-mercaptoacetate), 1,4-dithiane-2,5-diol bis(3-mercaptopropionate), 2,5-bis(mercaptomethyl)-1,4-dithiane, 2,5-bis(2-mercaptoethyl)-1,4-dithiane, 2,5-bis(3-mercaptopropyl)-1,4-dithiane, 2-(2-mercaptoethyl)-5-mercaptomethyl-1,4-dithiane, 2-(2-mercaptoethyl)-5-(3-mercaptopropyl)-1,4-dithiane, 2-mercaptomethyl-5-(3-mercaptopropyl)-1,4-dithiane, thioglycolic acid bis(2-mercaptoethyl ester), thiodipropionic acid bis(2-mercaptoethyl ester), 4,4'-thiodibutyric acid bis(2-mercaptoethyl ester), dithiodiglycolic acid bis(2-mercaptoethy ester), dithiodipropionic acid bis(2-mercaptoethyl ester), 4,4'-dithiodibutyric acid bis(2-mercaptoethyl ester), thiodiglycolic acid bis(2,3-dimercaptopropyl ester), thiodipropionic acid bis(2,3-dimercaptopropyl ester), dithiodiglycolic acid bis(2,3-dimercaptopropyl ester), dithiodipropionic acid (2,3-dimercaptopropyl ester), 2-mercaptomethyl-6-mercapto-1,4-dithiacycloheptane, 4,5-bis(mercaptomethylthio)-1,3-dithiolane, 4,6-bis(mercaptomethylthio)1,3-dithiane, 2-bis(mercaptomethylthio)methyl-1,3-dithietane, 2-(2,2-bis(mercaptomethylthio)ethyl)-1,3-dithietane, 1,2,7-trimercapto-4,6-dithiaheptane, 1,2,9-trimercapto-4,6,8- trithianonane, 1,2,11,-trimercapto-4,6,8,10-tetrathiaundecane, 1,2,13-trimercapto-4,6,8,10,12-pentathiatridecane, 1,2,8,9-tetramercapto-4,6-dithianonane, 1,2,10,11-tetramercapto-4,6,8-trithiaundecane, 1,2,12,13-tetramercapto-4,6,8,10-tetrathiatridecane, bis(2,5-dimercapto-4-thiapentyl)disulfide, bis(2,7-dimercapto-4,6-dithiaheptyl) disulfide, 1,2,5-trimercapto-4-thiapentane, 3,3-dimercaptomethyl-1,5-dimercapto-2,4-dithiapentane, 3-mercaptomethyl-1,5-dimercapto-2,4-dithiapentane, 3-mercaptomethylthio-1,7-dimercapto-2,6-dithiaheptane, 3,6-dimercaptomethyl-1,9-dimercapto-2,5,8-trithianonane, 3,7-dimercaptomethyl-1,9-dimercapto-2,5,8-trithianonane, 4,6-dimercaptomethyl-1,9-dimercapto-2,5,8-trithianonane, 3-mercaptomethyl-1,6-dimercapto-2,5-dithiahexane, 3-mercaptomethylthio-1,5-dimercapto-2-thiapentane, 1,1,2,2-tetrakis(mercaptomethylthio)ethane, 1,1,3,3-tetrakis(mercaptomethylthio)propane, 1,4,8,11-tetramercapto-2,6,10-trithiaundecane, 1,4,9,12-tetramercapto-2,6,7,11-tetrathiadodecane, 2,3-dithia-1,4-butanedithiol, 2,3,5,6-tetrathia-1,7-heptanedithiol, 2,3,5,6,8,9-hexathia-1,10-decanedithiol, 2-(1-mercapto-2-mercaptomethyl-3-thiabutyl)-1,3-dithiolane, 1,5-dimercapto-3-mercaptomethylthio-2,4-dithiapentane, 2-mercaptomethyl-4-mercapto-1,3-dithiolane, 2,5-dimercapto-1,4-dithiane, 2,6-dimercapto-1,4-dithiane, 2,4-dimercaptomethyl-1,3-dithietane, 1,2,6,10,11-pentamercapto-4,8-dithiaundecane, 1,2,9,10-tetramercapto-6-mercaptomethyl-4,7-dithiadecane, 1,2,9,13,14-pentamercapto-6-mercaptomethyl-4,7,11-trithiatetradecane, 1,2,6,10,14,15-hexamercapto-4,8,12-trithiapentadecane, 1,4-dithiane-2,5-bis(4,5-dimercapto-2-thiapentane) and 1,4-dithiane-2,5-bis(5,6-dimercapto-2,3-dithiahexane)

Heterocycle-containing polythiols containing sulfur atom in addition to mercapto group; 3,4-thiophenedithiol, tetrahydrothiophene-2,5-dimercaptomethyl and 2,5-dimercapto-1,3,4-thiadiazole Polythiols containing isocyanurate group; 1,2-bis[(2-mercaptoethyl)thio]-3-mercaptopropane, tris-{(3-mercaptopropionyloxy)-ethyl}-isocyanurate, 1,3,5-tris(3-mercaptobutyryloxyethyl)-1,3,5-triazine-2,4,6(1H,3H,5H)-trione and tris-[(3-mercaptopropionyloxy)-ethyl]-isocyanurate As the above component (B) in the present invention, a compound having at least one hydroxyl group and at least one thiol group in one molecule may also be used. Examples of the compound include the following compounds.

2-mercaptoethanol, 3-mercapto-1,2-propanediol, glycerin di(mercaptoacetate), 1-hydroxy-4-mercaptocyclohexane, 2,4-dimercaptophenol, 2-mercaptohydroquinone, 4-mercaptophenol, 1,3-dimercapto-2-propanol, 2,3-dimercapto-1-propanol, 1,2-dimercapto-1,3-butanediol, pentaerythritol tris(3-mercaptopropionate), pentaerythritol mono(3-mercaptopropionate), pentaerythritol bis(3-mercaptopropionate), pentaerythritol tris(thioglycolate), pentaerythritol pentakis(3-mercaptopropionate), hydroxymethyl-tris(mercaptoethylthiomethyl)methane, 1-hydroxyethylthio-3-mercaptoethylthiobenzene, 4-hydroxy-4'-mercaptodiphenyl sulfone, 2-(2-mercaptoethylthio)ethanol, dihydroxyethyl sulfide mono(3-mercaptopropionate), dimercaptoethane mono(salicylate) and hydroxyethylthiomethyl-tris(mercaptoethylthio)methane A compound having a silsesquioxane structure may also be used as the component (B). The silsesquioxane is a compound represented by the following formula (1).

(1)

{In the above formula, a plurality of $R^1$'s may be the same or different and each an organic group containing at least two hydroxyl groups and/or thiol groups in one molecule, $R^1$ except for the organic group having hydroxyl groups or thiol groups is a hydrogen atom, alkyl group, cycloalkyl group, alkoxy group or phenyl group, and the polymerization degree "n" is an integer of 6 to 100.}

The alkyl group represented by $R^1$ is preferably an alkyl group having 1 to 10 carbon atoms. Examples of the alkyl group having 1 to 10 carbon atoms include methyl group, ethyl group, n-propyl group, isopropyl group, n-butyl group, sec-butyl group, tert-butyl group, n-pentyl group, n-hexyl group, n-octyl group and isooctyl group.

The cycloalkyl group is preferably a cycloalkyl group having 3 to 8 carbon atoms. Examples of the cycloalkyl group having 3 to 8 carbon atoms include cyclopropyl group, cyclobutyl group, cyclooctyl group, cyclohexyl group, cycloheptyl group and cyclooctyl group.

The alkoxy group is preferably an alkoxy group having 1 to 6 carbon atoms. Examples of the alkoxy group having 1 to 6 carbon atoms include methoxy group, ethoxy group, n-propoxy group, isopropoxy group, n-butoxy group, sec-butoxy group and tert-butoxy group.

In general, the silsesquioxane compound may take various structures such as cage-like, ladder-like and random structures. In the present invention, a mixture having a plurality of structures is preferably used.

<Preferred Examples of Component (B)>

Preferred examples of the poly(thi)ol compound as the above component (B) include ditrimethylolpropane, trimethylolpropane tripolyoxyethylene ether (TMP-30 of Japan Nyukazai Co., Ltd.), glyceryl monooleate (Monoolein of Tokyo Chemical Industry Co., Ltd.), monoelaidin, polyethylene polyol, polycaprolactone polyol, polycarbonate polyol, trimethylolpropane, pentaerythritol, trimethylolpropane tris(3-mercaptopropionate), pentaerythritol tetrakis(3-mercaptoproanate), dipentaerythritol hexakis(3-mercaptopropionate), tetraethylene glycol bis(3-mercaptopropionate), 1,4-butanediol bis(3-mercaptopropionate), 1,6-hexanediol bis(3-mercaptopropionate), 1,2-bis[(2-mercaptoethyl)thio]-3-mercaptopropane, 2,2-bis(mercaptomethyl)-1,4-butanedithiol, 1,4-bis(mercaptopropylthiomethyl)benzene, 2,5-bis(mercaptomethyl)-1,4-dithiane, 4-mercaptomethyl-1,8-dimercapto-3,6-dithiaoctane, 1,1,1,1-tetrakis(mercaptomethyl)methane, 1,1,3,3-tetrakis(mercaptomethylthio)propane, 1,1,2,2-tetrakis(mercaptomethylthio)ethane, 4,6-bis(mercaptomethylthio)-1,3-dithiane, 2-mercaptomethanol and tris-{(3-mercaptopropionyloxy)-ethyl}-isocyanurate Particularly, glyceryl monooleate and monoelaidin have the great effect of improving photochromic properties. This is because they have a free terminal alkyl chain having no polymerizable group at an end, thereby forming a flexible space therearound. Therefore, as the reversible structural change of the photochromic compound existent near this space is caused to occur swiftly, a photochromic cured body having excellent photochromic properties (color optical density, fading speed) can be produced. The same effect is obtained from poly(thi)ol compounds having a free terminal chain besides the poly(thi)ol compounds enumerated above.

A description is subsequently given of the mono(thi)ol compound having one hydroxyl group or thiol group in one molecule (C).

<(C) Mono(thi)ol Compound Having One Hydroxyl Group or Thiol Group in One Molecule>

The photochromic composition of the present invention is characterized in that it comprises (C) a mono(thi)ol compound having one hydroxyl group or thiol group in one molecule (may be simply referred to as "mono(thi)ol compound" hereinafter) in addition to the above components (A) and (B). When the photochromic composition of the present invention is cured, a rigid cured body having a net-like structure with a (thio)urethane bond is obtained from a reaction between a polyiso(thio)cyanate compound and a poly(thi)ol compound. When the above component (C) is further mixed with the photochromic composition, the mono (thi)ol compound having a free structure at one end is introduced into the net-like structure, thereby forming a flexible space around the mono(thi)ol compound. Therefore, as the reversible structural change of the photochromic compound existent near this space is caused to occur swiftly, a photochromic cured body having excellent photochromic properties (color optical density, fading speed) can be produced. Due to the function of the photochromic composition of the present invention, high photochromic properties can be developed even when a small amount of the photochromic compound is used. Therefore, even when a photochromic compound having low solubility is used, a photochromic cured body which is fully practically usable can be obtained.

Further, it is considered that, since the mono(thi)ol compound has only one hydroxyl group or thiol group, the number of hydrogen bonds is smaller than that of a poly (thi)ol compound with the result that the viscosity of the photochromic composition can be reduced, thereby making it possible to improve handling performance at the time of casting and moldability. Examples of the above mono(thi)ol compound used in the photochromic composition of the present invention include the following compounds.

Compounds having one hydroxyl group in one molecule; polyethylene glycol monooleyl ether, polyoxyethylene oleate, polyethylene glycol monolaurate, polyethylene glycol monostearate, polyethylene glycol mono-4-octylphenyl ether, linear polyoxyethylene alkyl ethers (polyethylene glycol monomethyl ether, polyoxyethylene lauryl ether, polyoxyethylene-2-ethylhexyl ether, polyoxyethylene tridecyl ether, polyoxyethylene cetyl ether, polyoxyethylene stearyl ether), polypropylene glycol monomethyl ether, glyceryl dioleate, and linear or branched saturated alkyl alcohols having 5 to 30 carbon atoms Compounds having one thiol group in one molecule; 3-methoxybutylthio glycolate, 2-ethylhexyl thioglycolate, 2-mercaptoethyloctanoic acid ester, 3-mercaptopropionic acid-3-methoxybutyl, ethyl 3-mercaptopropionate, 3-mercaptopropionic acid-2-octyl, n-octyl-3-mercaptopropionate, methyl-3-mercaptopropionate, tridecyl-3-mercaptopropionate, stearyl-3-mercaptopropionate, and linear or branched saturated alkyl thiols having 5 to 30 carbon atoms.

In the present invention, when the content of the component (C) is too low, it rarely contributes to the improvement of photochromic properties and when the content of the component (C) is too high, the hardness of the photochromic cured body lowers. Therefore, the content of the component (C) is preferably 2 to 40 parts by mass, more preferably 2 to 30 parts by mass, most preferably 2 to 25 parts by mass based on 100 parts by mass of the total of the components (A), (B) and (C). The component (C) of the present invention has excellent photochromic properties when it is contained in the composition in the above ratio. To develop more excellent photochromic properties, the molecular weight of the compound as the component (C) is preferably not less than 100, more preferably not less than 150.

Further, to reduce the viscosity of the photochromic composition in order to improve the moldability of the photochromic cured body, mixing a component (C) having a low molecular weight and low viscosity and a component (C) having a high molecular weight is also effective.

<Preferred Mixing Ratio of Components (A), (B) and (C)>

As for the optimum mixing ratio of the above components (A), (B) and (C) to obtain the excellent photochromic properties and hardness of the photochromic cured body, preferably, the photochromic composition comprises 20 to 77 parts by mass of the component (A), 21 to 78 parts by mass of the component (B) and 2 to 40 parts by mass of the component (C) based on 100 parts by mass of the total of the component (A), (B) and (C). More preferably, the photochromic composition comprises 25 to 73 parts by mass of the component (A), 25 to 73 parts by mass of the component (B) and 2 to 30 parts by mass of the component (C). Most preferably, the photochromic composition comprises 30 to 69 parts by mass of the component (A), 29 to 68 parts by mass of the component (B) and 2 to 25 parts by mass of the component (C).

<(D) Photochromic Compound>

Photochromic compounds known per se may be used as the photochromic compound exhibiting photochromic properties. They may be used alone or in combination of two or more.

Typical examples of the photochromic compounds include fulgide compounds, chromene compounds and spirooxazine compounds and are disclosed by many documents, for example, JP-A 2-28154, JP-A 62-288830, WO94/22850 and WO96/14596.

In the present invention, out of known photochromic compounds, from the viewpoints of photochromic properties such as color optical density, initial coloration, durability and fading speed, chromene compounds having an indeno (2,1-f)naphtho(1,2-b)pyran skeleton are preferably used, and chromene compounds having a molecular weight of not less than 540 are particularly preferably used as they are excellent particularly in color optical density and fading speed.

The following chromene compounds are particularly preferably used in the present invention.

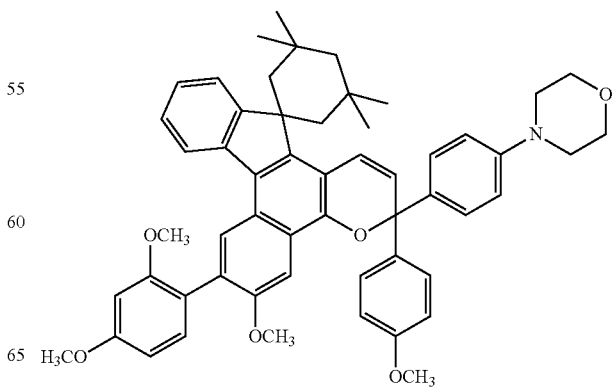

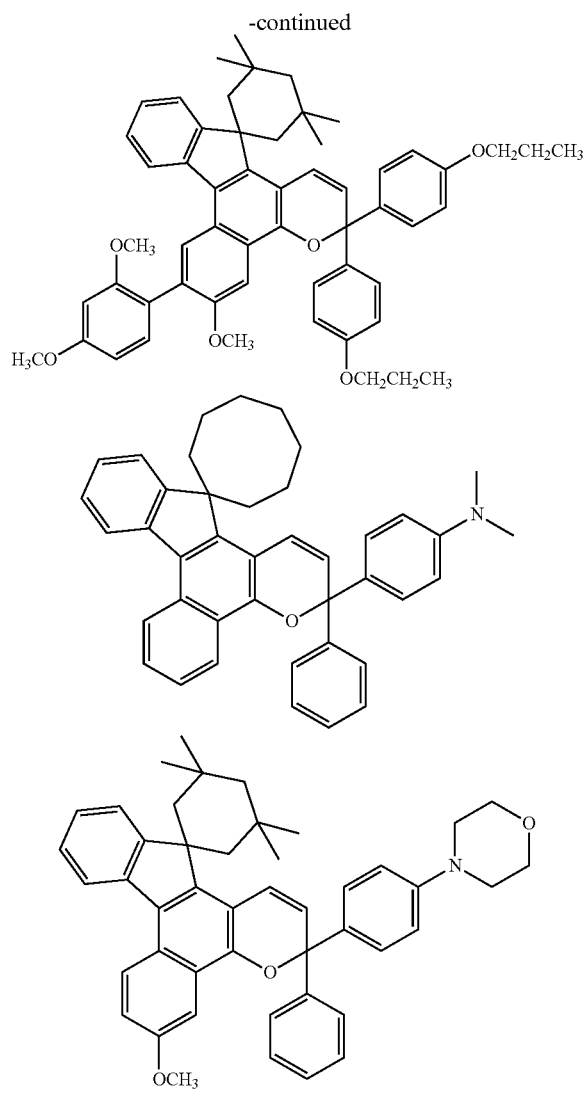

<(E) Polyrotaxane Having a Composite Molecular Structure Composed of an Axial Molecule and a Plurality of Cyclic Molecules Clathrating the Axial Molecule>

It is preferred that the photochromic composition of the present invention should further comprise a polyrotaxane in order to manufacture a cured body exhibiting more excellent photochromic properties. The polyrotaxane is a known compound. As shown in FIG. 1, the polyrotaxane molecule represented by "1" as a whole has a composite molecular structure composed of a chain axial molecule "2" and cyclic molecules "3". That is, a plurality of the cyclic molecules "3" clathrate the chain axial molecule "2", and the axial molecule "2" passes through the inside of the ring of each of the cyclic molecules "3". Therefore, the cyclic molecules "3" can slide freely over the axial molecule "2" but a bulky terminal group "4" is formed at both ends of the axial molecule "2" to prevent the cyclic molecules "3" from falling off from the axial molecule "2".

It is believed that, as the cyclic molecules "3" of the polyrotaxane can slide over the axial molecule "2", a space is formed around the cyclic molecules, and the reversible structural change of the photochromic compound occurs swiftly due to this space with the result of improved fading speed and improved color optical density. Further, the introduction of the cyclic molecules into which a side chain 5 has been introduced causes the reversible structural change of the photochromic compound existent near the side chains having high flexibility swiftly. It is possible to develop more excellent photochromic properties by using this polyrotaxane in combination with the above-described mono(thi)ol compound having one hydroxyl group or thiol group in one molecule.

In the above polyrotaxane, various axial molecules are known. For example, the chain part may be linear or branched as long as the axial molecule can pass through the rings of the cyclic molecules and is generally formed of a polymer.

Examples of the polymer forming the chain part of the axial molecule include polyvinyl alcohol, polyvinyl pyrrolidone, cellulose-based resins (such as carboxymethyl cellulose, hydroxyethyl cellulose and hydroxypropyl cellulose), polyacrylamide, polyethylene oxide, polyethylene glycol, polypropylene glycol, polyvinyl acetal, polyvinyl methyl ether, polyamine, polyethylene imine, casein, gelatin, starch, olefin-based resins (such as polyethylene and polypropylene), polyester, polyvinyl chloride, styrene-based resins (such as polystyrene and acrylonitrile-styrene copolymer resin), acrylic resins (such as poly(meth)acrylic acid, polymethyl methacrylate, polymethyl acrylate and acrylonitrile-methyl acrylate copolymer resin), polycarbonate, polyurethane, vinyl chloride-vinyl acetate copolymer resin, polyvinyl butyral, polyisobutylene, polytetrahydrofuran, polyaniline, acrylonitrile-butadiene-styrene copolymer (ABS resin), polyamides (such as nylon), polyimide, polydienes (such as polyisoprene and polybutadiene), polysiloxanes (such as polydimethylsiloxane), polysulfone, polyimine, polyacetic anhydride, polyurea, polysulfide, polyphosphazene, polyketone polyphenylene and polyhalo olefins. These polymers may be copolymerized or modified.

In the present invention, the polymer forming the chain part is preferably polyethylene glycol, polyisoprene, polyisobutylene, polybutadiene, polypropylene glycol, polytetrahydrofuran, polydimethylsiloxane, polyethylene, polypropylene, polyvinyl alcohol or polyvinyl methyl ether, most preferably polyethylene glycol.

Although the bulky group formed at both ends of the chain part is not particularly limited if it is a group which prevents the cyclic molecules from being eliminated from the axial molecule, from the viewpoint of bulkiness, the bulky group is selected from adamantyl group, trityl group, fluoresceinyl group, dinitrophenyl group and pyrenyl group, out of which adamantyl group is preferred from the viewpoint of introduction ease.

Although the molecular weight of the above-described axial molecule is not particularly limited, when it is too high, compatibility with another component tends to become low and when it is too low, the movability of the cyclic molecules degrades, whereby photochromic properties tend to deteriorate. From this point of view, the weight average molecular weight Mw of the axial molecule is 1,000 to 100,000, preferably 5,000 to 80,000, particularly preferably 10,000 to 50,000.

Each of the cyclic molecules should have a ring large enough to clathrate the above axial molecule, and examples of this ring include cyclodextrin ring, crown ether ring, benzo-crown ring, dibenzo-crown ring and dicyclohexano-crown ring, out of which cyclodextrin ring is particularly preferred.

The cyclodextrin ring has α-form (ring inner diameter of 0.45 to 0.6 nm), β-form (ring inner diameter of 0.6 to 0.8 nm) or γ-form (ring inner diameter of 0.8 to 0.95 nm). In the present invention, α-cyclodextrin ring and γ-cyclodextrin ring are preferred, and α-cyclodextrin ring is most preferred.

A plurality of the cyclic molecules having the above ring clathrate one axial molecule. In general, when the maximum number of cyclic molecules capable of clathrating one axial molecule is 1, the number of clathrating cyclic molecules is preferably 0.001 to 0.6, more preferably 0.002 to 0.5, much more preferably 0.003 to 0.4. When the number of clathrating cyclic molecules is too large, the cyclic molecules are densely existent for one axial molecule, whereby their movability degrades and accordingly, photochromic properties tend to deteriorate. When the number of clathrating cyclic molecules is too small, the space between axial molecules becomes narrow, whereby the number of spaces capable of allowing for the reversible reaction of the photochromic compound molecule decreases and accordingly, photochromic properties tend to deteriorate as well.

The maximum number of cyclic molecules clathrating one axial molecule can be calculated from the length of the axial molecule and the thickness of the ring of each of the cyclic molecules.

For example, when the chain part of the axial molecule is formed of polyethylene glycol and the ring of the cyclic molecule is an α-cyclodextrin ring, the maximum number of clathrating cyclic molecules is calculated as follows.

That is, two recurring units [—$CH_2$—$CH_2O$—] of polyethylene glycol approximate the thickness of one α-cyclodextrin ring. Therefore, the number of the recurring units is calculated from the molecular weight of polyethylene glycol so as to obtain ½ of the number of the recurring units as the maximum number of clathrating cyclic molecules. Based on the condition that the maximum number of clathrating cyclic molecules is 1.0, the number of clathrating cyclic molecules is adjusted to the above-specified range.

Further, in the present invention, the side chain may be introduced into the ring of the above-described cyclic molecule. This side chain is represented by "5" in FIG. 1.

That is, by introducing this side chain "5" into the ring, an appropriate space can be surely formed between adjacent axial molecules, thereby making it possible to ensure a space capable of allowing for the reversible reaction of the photochromic compound molecule and to develop excellent photochromic properties. This side chain "5" forms a pseudo crosslinked structure in the polyrotaxane, whereby the mechanical strength of a photochromic cured body formed by using the photochromic composition of the present invention can be improved.

The above side chain is preferably formed by the recurring unit of an organic chain having 3 to 20 carbon atoms, and the weight average molecular weight of this side chain is preferably 200 to 10,000, more preferably 250 to 8,000, much more preferably 300 to 5,000, most preferably 300 to 1,500. That is, when the side chain is too small, its function of ensuring the space capable of allowing for the reversible reaction of the photochromic compound molecule becomes unsatisfactory and when the side chain is too large, it is difficult to closely mix the photochromic compound which will be described hereinafter with the polyrotaxane, thereby making it difficult to fully utilize the space ensured by the polyrotaxane.

Further, the above side chain is introduced by using the functional groups of the ring of the cyclic molecule and modifying them. For example, the α-cyclodextrin ring has 18 hydroxyl groups as functional groups through which the side chain is introduced. That is, a maximum of 18 side chains can be introduced into one α-cyclodextrin ring. In the present invention, to obtain the function of the above-described side chain fully, not less than 6%, particularly not less than 30% of the total number of all the functional groups of the ring are preferably modified by the side chain. When the side chain is bonded to 9 out of the 18 hydroxyl groups of the above α-cyclodextrin ring, the degree of modification is 50%.

In the present invention, the above side chain (organic chain) may be linear or branched as long as its size falls within the above range, and a side chain having an appropriate size can be introduced by reacting a suitable compound with the functional groups of the above ring by using ring-opening polymerization, radical polymerization, cationic polymerization, anionic polymerization or living radical polymerization such as atom transfer radical polymerization, RAFT polymerization or NMP polymerization.

For example, a side chain derived from a cyclic compound such as cyclic lactone, cyclic ether, cyclic acetal, cyclic amine, cyclic carbonate, cyclic iminoether or cyclic thiocarbonate can be introduced by ring-opening polymerization. From the viewpoints of acquisition ease, high reactivity and easy control of size (molecular weight), a cyclic ether, cyclic siloxane, cyclic lactone or cyclic carbonate is preferably used. Preferred examples of the cyclic compound are given below.

Cyclic ethers; ethylene oxide, 1,2-propylene oxide, epichlorohydrin, epibromohydrin, 1,2-butylene oxide, 2,3-butylene oxide, isobutylene oxide, oxetane, 3-methyloxetane, 3,3-dimethyloxetane, tetrahydrofuran, 2-methyl tetrahydrofuran and 3-methyl tetrahydrofuran Cyclic siloxanes; hexamethyl cyclotrisiloxane and octamethyl cyclotetrasiloxane Cyclic Lactones;

4-membered cyclic lactones; β-propiolactone, β-methyl propiolactone and L-serine-β-lactone 5-membered cyclic lactones; γ-butyrolactone, γ-hexanolactone, γ-heptanolactone, γ-octanolactone, γ-decanolactone, γ-dodecanolactone, α-hexyl-γ-butyrolactone, α-heptyl-γ-butyrolactone, α-hydroxy-γ-butyrolactone, γ-methyl-γ-decanolactone, α-methylene-γ-butyrolactone, α,α-dimethyl-γ-butyrolactone, D-erythronolactone, α-methyl-γ-butyrolactone, γ-nonanolactone, DL-pantolactone, γ-phenyl-γ-butyrolactone, γ-undecanolactone, γ-valerolactone, 2,2-pentamethylene-1,3-dioxolan-4-one, α-bromo-γ-butyrolactone, γ-crotonolactone, α-methylene-γ-butyrolactone, α-methacryloyloxy-γ-butyrolactone and β-methacryloyloxy-γ-butyrolactone 6-membered cyclic lactones; δ-valerolactone, δ-hexanolactone, δ-octanolactone, δ-nonanolactone, δ-decanolactone, δ-undecanolactone, δ-dodecanolactone, δ-tridecanolactone, δ-tetradecanolactone, DL-mevalonolactone, 4-hydroxy-1-cyclohexane carboxylic acid δ-lactone, monomethyl-δ-valerolactone, monoethyl-δ-valerolactone, monohexyl-δ-valerolactone, 1,4-dioxan-2-one and 1,5-dioxepan-2-one 7-membered cyclic lactones; non-alkyl-ε-caprolactone, dialkyl-ε-caprolactone, monomethyl-ε-caprolactone monoethyl-ε-caprolactone, monohexyl-ε-caprolactone, dimethyl-ε-caprolactone, di-n-propyl-ε-caprolactone di-n-hexyl-ε-caprolactone, trimethyl-ε-caprolactone triethyl-ε-caprolactone, tri-n-ε-caprolactone, ε-caprolactone, 5-nonyl-oxepan-2-one, 4,4,6-trimethyl-oxepan-2-one, 4,6,6-trimethyl-oxepan-2-one and 5-hydroxymethyl-oxepan-2-one 8-membered cyclic lactones; ξ-enantholactone other cyclic lactones; lactone, lactide, dilactide, tetramethyl glycoside, 1,5-dioxepan-2-one and t-butyl caprolactone Cyclic carbonates; ethylene carbonate, propylene carbonate, 1,2-butylene carbonate, glycerol 1,2-carbonate, 4-(methoxymethyl)-1,3-dioxolan-2-one, (chloromethyl)ethylene carbonate, vinylene carbonate, 4,5-dimethyl-1,3-dioxol-2-one, 4-chloromethyl-5-methyl-1,3-dioxol-2-one, 4-vinyl-1,3-dioxolan-2-one, 4,5-diphenyl-1,3-dioxolan-2-one, 4,4-dimethyl-5-methylene-1,3-dioxolan-2-one, 1,3-dioxan-2-one, 5-methyl-5-propyl-1,3-dioxolan-2-one and 5,5-diethyl-1,3-dioxolan-2-one The above cyclic compounds may be used alone or in combination.

In the present invention, cyclic lactones and cyclic carbonates are preferred, lactones such as ε-caprolactone, α-acetyl-γ-butyrolactone, α-methyl-γ-butyrolactone, γ-valerolactone and γ-butyrolactone are particularly preferred, and ε-caprolactone is most preferred.

When the side chain is to be introduced by reacting the cyclic compound through ring-opening polymerization, there is a case where functional groups (for example, hydroxyl groups) bonded to the ring have poor reactivity and it is difficult to directly react a large molecule due to steric hindrance. In this case, in order to react caprolactone, there can be employed means for introducing the side chain through ring-opening polymerization using the above-described cyclic compound after a highly reactive functional group (hydroxyl group) is introduced by hydroxypropylation through a reaction between a low-molecular weight compound such as propylene oxide and the functional group.

Although the compound used to introduce the side chain by using radical polymerization is a radically polymerizable compound, the ring of the cyclic molecule of the polyrotaxane does not have an active site as a radical starting point. Therefore, prior to the reaction of the radically polymerizable compound, a compound for forming the radical starting point must be reacted with a functional group (hydroxyl group) of the ring to form the active site as the radical starting point.

The compound for forming the above radical starting point is typified by organic halogen compounds such as 2-bromoisobutyryl bromide, 2-bromobutyric acid, 2-bromopropionic acid, 2-chloropropionic acid, 2-bromoisobutyric acid, epichlorohydrin, epibromohydrin and 2-chloroethy isocyanate.

That is, the organic halogen compound is bonded to the ring of the cyclic molecule through a condensation reaction with a functional group of the ring, thereby introducing a group containing a halogen atom (organic halogen compound residue). A radical is produced in this organic halogen compound residue by the movement of a halogen atom upon radical polymerization to become the radical polymerization starting point from which radical polymerization proceeds.

The above group having an active site as the radical polymerization starting point (organic halogen compound residue) can also be introduced, for example, by reacting a compound having a functional group such as amine, carboxylic acid, isocyanate, imidazole or acid anhydride with a hydroxyl group of the ring to introduce a functional group other than the hydroxyl group and reacting the above-described organic halogen compound with this functional group.

As the radically polymerizable compound used to introduce the side chain through radical polymerization, a compound having at least one group with an ethylenically unsaturated bond, for example, a functional group such as (meth)acrylic group, vinyl group or styryl group (to be referred to as "ethylenically unsaturated monomer" hereinafter) is preferably used.

The following compounds are examples of the ethylenically unsaturated monomer.

Alkyl (meth)acrylates; methyl (meth)acrylate, ethyl (meth)acrylate, n-propyl (meth)acrylate, n-butyl (meth) acrylate, t-butyl (meth)acrylate and stearyl (meth)acrylate Hydroxy (meth)acrylates; 2-hydroxyethyl (meth)acrylate and 2-hydroxypropyl (meth)acrylates Cyano (meth)acrylates; cyanoethyl (meth)acrylate Amino-based (meth)acrylates; (meth)acrylamide, N,N-dimethyl (meth)acrylamide, N-isopropyl (meth)acrylamide, N,N-dimethylaminoethyl (meth)acrylate and maleinimide (meth)acrylate Fluoroalkyl (meth)acrylates; trifluoroethyl (meth)acrylate and pentaflurobutyl (meth)acrylate Siloxanyl (meth)acrylates; tris(trimethylsiloxanyl)silylpropyl (meth)acrylate Alkylene glycol polyol (meth)acrylates; ethylene glycol (meth)acrylate, triethyleneglycol (meth)acrylate, polyethylene glycol (meth)acrylate, propylene glycol (meth)acrylate and polypropylene glycol (meth)acrylate Aromatic vinyl compounds; styrene, p-methylstyrene, m-methoxystyrene and p-hydroxystyrene Vinyl salt compounds; sodium 4-vinyl benzoate and sodium p-styrene sulfonate Amphoteric (meth)acrylates; 2-methoxyacryloyloxyethyl phosphorylcholine and [2-(methacryloyloxy)ethyl]dimethyl (3-sulfopropyl) ammonium hydroxide Unsaturated monocarboxylic acids or esters thereof; cinnamic acid and crotonic acid Oxirane compounds; glycidyl (meth)acrylate Oxetane compounds; 2-oxetanemethyl (meth)acrylate Unsaturated polycarboxylic acids (anhydrides); maleic acid (anhydride) and fumaric acid (anhydride)

Besides the ethylenically unsaturated monomers, oligomers or polymers having a terminal ethylenically unsaturated bond (to be also referred to as "macromonomers" hereinafter) may also be used.

Components forming the main chains of these macromonomers are given below.

Polyethers; polyethylene oxide, polypropylene oxide and polytetramethylene oxide Polyesters; polyethylene terephthalate and polycaprolactone Polymers having a hydrocarbon main chain; polyethylene, polypropylene, polystyrene, polyvinyl methyl ether and poly (meth)acrylate Polyamides; polyhexamethylene adipamide Other polymers; polyimide acid, polyimine amine, polyurethane, polyurea, polydimethylsiloxane and polycarbonate polymers Copolymers of the above polymers;

The above-described monomers or macromonomers may be used alone or in combination of two or more.

The above-described side chain of an appropriate size is introduced by using the above radically polymerizable compound to carry out radical polymerization (preferably, living radical polymerization such as atom transfer radical polymerization, RAFT polymerization (reversible addition-fragmentation chain transfer polymerization) or NMP polymerization (nitroxide-mediated radical polymerization)) in the presence of the ring into which the above radical polymerization starting point has been introduced and adjusting the degree of polymerization to a suitable range.

As understood from the above explanation, the side chain to be introduced into the ring of the cyclic compound has a recurring unit introduced by —O— bond, —NH— bond or —S— bond or a substituent such as hydroxyl group, carboxyl group, acyl group, phenyl group, halogen atom, silyl group, thiol group, vinyl group, episulfide group, thietanyl group, isocyanate group or thioisocyanate group according to the introduction system.

The polyrotaxane used in the present invention is polymerized with at least one compound out of the components (A), (B) and (C) to ensure that the photochromic compound is dispersed and homogeneously held in the space of the polyrotaxane in the cured body, thereby making it possible to develop excellent photochromic properties continuously and enhance the mechanical strength of the cured body. Therefore, the side chain of the polyrotaxane is preferably selected from the group consisting of hydroxyl group, thiol group, episulfide group, thietanyl group, isocyanate group and thioisocyanate group, more preferably selected from hydroxyl group and thiol group, most preferably selected from hydroxyl group.

Further, according to the type of the functional group of the compound used for the introduction of the side chain, part of the side chain may be bonded to a functional group of the ring of the cyclic molecule of another axial molecule to form a crosslinked structure.

This polymerizable functional group is introduced by using the above-described side chain, and a compound suitable for the formation of the side chain is used.

In the present invention, the polyrotaxane (E) which is most preferably used has an axial molecule formed of polyethylene glycol and bonded to an adamantyl group at both ends and cyclic molecules having an a-cyclodextrin ring into which the side chain (terminal OH group) has been introduced by polycaprolactone.

<Mixing Ratio of Components (A), (B), (C) and (E)>

More excellent photochromic properties are obtained by using the above-described polyrotaxane (E). However, when the content of the polyrotaxane (E) is too high, moldability deteriorates due to a rise in viscosity. When the content of the polyrotaxane (E) is too low, it rarely contributes to photochromic properties. As for the optimum mixing ratio of the above components (A), (B), (C) and (E) of the photochromic composition comprising the polyrotaxane (E), preferably, the photochromic composition comprises 20 to 77 parts by mass of the component (A), 20 to 77 parts by mass of the component (B), 2 to 40 parts by mass of the component (C) and 1 to 30 parts by mass of the component (E) based on 100 parts by mass of the total of the components (A), (B), (C) and (E). More preferably, the photochromic composition comprises 25 to 73 parts by mass of the component (A), 23 to 71 parts by mass of the component (B), 2 to 30 parts by mass of the component (C) and 2 to 25 parts by mass of the component (E). Most preferably, the photochromic composition comprises 30 to 70 parts by mass of the component (A), 26 to 66 parts by mass of the component (B), 2 to 25 parts by mass of the component (C) and 2 to 20 parts by mass of the component (E).

<(F) Resin Modifier, (G) Polymerization-Curing Accelerator, (H) Internal Release Agent>

In the present invention, besides the components (A), (B), (C) and (D), a resin modifier (F), a polymerization-curing accelerator (G) and an internal release agent (H) may be further contained to improve refractive index and moldability and adjust the hardness of a cured body.

<(F) Resin Modifier>

In the present invention, a resin modifier may be added to improve the refractive index of the obtained cured body and adjust the hardness of the cured body. Examples of the resin modifier include episulfide-based compounds, thietanyl-based compounds, polyamine compounds, epoxy compounds and olefin compounds including (meth)acrylate compounds. Specific examples are described below.

<Episulfide-Based Compounds>

The episulfide-based compounds are compounds having at least two episulfide groups in one molecule and cured by ring-opening polymerization. These compounds may be added to obtain a high refractive index. Examples of the episulfide-based compounds are given below.

Bis(1,2-epithioethyl)sulfide, bis(1,2-epithioethyl)disulfide, bis(2,3-epithiopropyl)sulfide, bis(2,3-epithiopropyldithio)methane, bis(2,3-epithiopropyl)disulfide, bis(2,3-epithiopropyldithio)methane, bis(2,3-epithiopropyldithio)ethane, bis(6,7-epithio-3,4-dithiaheptyl)sulfide, bis(6,7-epithio-3,4-dithiaheptyl)disulfide, 1,4-dithiane-2,5-bis(2,3-epithiopropyldithiomethyl), 1,3-bis(2,3-epithiopropyldithiomethyl)benzene, 1,6-bis(2,3-epithiopropyldithiomethyl)-2-(2,3-epithiopropyldithioethylthio)-4-thiahexane, 1,2,3-tris(2,3-epithiopropyldithio)propane, 1,1,1,1-tetrakis(2,3-epithiopropyldithiomethyl)methane, 1,3-bis(2,3-epithiopropyldithio)-2-thiapropane, 1,4-bis(2,3-epithiopropyldithio)-2,3-dithiabutane, 1,1,1-tris(2,3-epithiopropyldithio)methane, 1,1,1-tris(2,3-epithiopropyldithiomethylthio)methane, 1,1,2,2-tetrakis(2,3-epithiopropyldithio)ethane, 1,1,2,2-tetrakis(2,3-epithiopropyldithiomethylthio) ethane, 1,1,3,3-tetrakis(2,3-epithiopropyldithio)propane, 1,1,3,3-tetrakis(2,3-epithiopropyldithiomethylthio) propane, 2-[1,1-bis(2,3-epithiopropyldithio)methyl]-1,3-dithietane, and 2-[1,1-bis(2,3-epithiopropyldithiomethylthio)methyl]-1,3-dithietane.

<Thietanyl-Based Compounds>

The thietanyl-based compounds are thietane compounds having at least two thietanyl groups in one molecule and cured by ring-opening polymerization. These compounds may be added to obtain a high refractive index. Some of the thietanyl-based compounds have an episulfide group together with a plurality of thietanyl groups, which are listed in the paragraph of the above episulfide-based compounds. Other thietanyl-based compounds include metal-containing thietane compounds having a metal atom in the molecule and non-metal thietane compounds containing no metal. Examples of the thietanyl-based compound are given below.

Non-metal thietane compounds; bis(3-thietanyl)disulfide, bis(3-thietanyl)sulfide, bis(3-thietanyl)trisulfide, bis(3-thietanyl)tetrasulfide, 1,4-bis(3-thietanyl)-1,3,4-trithiabutane, 1,5-bis(3-thietanyl)-1,2,4,5-tetrathiapentane, 1,6-bis(3-thietanyl)-1,3,4,6-tetrathiahexane, 1,6-bis(3-thietanyl)-1,3,5,6-tetrathiahexane, 1,7-bis(3-thietanyl)-1,2,4,5,7-pentathiaheptane, 1,7-bis(3-thietanylthio)-1,2,4,6,7-pentathiaheptane, 1,1-bis(3-thietanylthio)methane, 1,2-bis(3-thietanylthio)ethane, 1,2,3-tris(3-thietanylthio)propane, 1,8-bis(3-thietanylthio)-4-(3-thietanylthiomethyl)-3,6-dithiaoctane, 1,11-bis(3-thietanylthio)-4,8-bis(3-thietanylthiomethyl)-3,6,9-trithiaundecane, 1,11-bis(3-thietanylthio)-4,7-bis(3-thietanylthiomethyl)-3,6,9-trithiaundecane, 1,11-bis(3-thietanylthio)-5,7-bis(3-thietanylthiomethyl)-3,6,9-trithiaundecane, 2,5-bis(3-thietanylthiomethyl)-1,4-dithiane, 2,5-bis[[2-(3-thietanylthio)ethyl]thiomethyl]-1,4-dithiane, 2,5-bis(3-thietanylthiomethyl)-2,5-dimethyl-1,4-dithiane, bisthietanyl sulfide, bis(thietanylthio)methane, 3-[<(thietanylthio)methylthio>methylthio]thietane, bisthietanyl disulfide, bisthietanyl trisulfide, bisthietanyl tetrasulfide, bisthietanyl pentasulfide, 1,4-bis(3-thietanyldithio)-2,3-dithiabutane, 1,1,1-tris(3-thietanyldithio)methane, 1,1,1-tris(3-thietanyldithiomethylthio)methane, 1,1,2,2-tetrakis(3-thietanyldithio)ethane and 1,1,2,2-tetrakis(3-thietanyldithiomethylthio)ethane <Metal-Containing Thietane Compounds>

The thietane compounds contain the group 14 element such as Sn atom, Si atom, Ge atom or Pb atom; the group 4 element such as Zr atom or Ti atom; the group 13 element such as Al atom; or the group 12 element such as Zn atom as the metal atom in the molecule. The following compounds are particularly preferably used.

Alkylthio (thietanylthio) tin's; methylthio tris(thietanylthio)tin, ethylthio tris(thietanylthio)tin, propylthio tris(thietanylthio) tin and isopropylthio tris(thietanylthio)tin Bis(alkylthio)bis(thietanylthio)tin's; bis(methylthio)bis(thietanylthio)tin, bis(ethylthio)bis(thietanylthio)tin, bis(propylthio)bis(thietanylthio)tin and bis(isopropylthio)bis(thietanylthio)tin Alkylthio(alkylthio)bis(thietanylthio)tin's; ethylthio(methylthio)bis(thietanylthio)tin, methylthio(propylthio)bis(thietanylthio)tin, isopropylthio(methylthio)bis(thietanylthio)tin, ethylthio(propylthio)bis(thietanylthio)tin, ethylthio(isopropylthio)bis(thietanylthio)tin and isopropylthio(propylthio)bis(thietanylthio)tin Bis(thietanylthio)cyclic dithiotin compounds; bis(thietanylthio)dithiastannetane, bis(thietanylthio)dithiastannolane, bis(thietanylthio)dithiastanninane and bis(thietanylthio)trithiastannocane Alkyl(thietanylthio)tin compounds; methyltris(thietanylthio)tin, dimethylbis(thietanylthio)tin, butyltris(thietanylthio)tin, tetrakis(thietanylthio)tin, tetrakis(thietanylthio)germanium and tris(thietanylthio)bismuth <Polyamine Compounds>

The polyamine compounds are compounds having at least two $NH_2$ groups in one molecule and form a urea bond through a reaction with a polyisocyanate or a thiourea bond through a reaction with a polyisothiocyanate. These monomers may be added to adjust the hardness. The following compounds are examples of the polyamine compound.

Ethylenediamine, hexamethylenediamine, isophoronediamine, nonamethylenediamine, undecamethylenediamine, dodecamethylenediamine, metaxylenediamine, 1,3-propanediamine, putrescine, 2-(2-aminoethylamino)ethanol, diethylenetriamine, p-phenylenediamine, m-phenylenediamine, melamine and 1,3,5-benzenetriamine <Epoxy-Based Compounds>

The epoxy compounds have an epoxy group in the molecule as a polymerizable group and are cured by ring-opening polymerization. These compounds may be added to adjust the refractive index and the hardness of a lens. The epoxy-based compounds are roughly divided into aliphatic epoxy compounds, alicyclic epoxy compounds and aromatic epoxy compounds exemplified by the following compounds.

Aliphatic epoxy compounds; ethylene oxide, 2-ethyl oxirane, butyl glycidyl ether, phenyl glycidyl ether, 2,2'-methylene bisoxirane, 1,6-hexanediol diglycidyl ether, ethylene glycol diglycidyl ether, diethylene glycol diglycidyl ether, triethylene glycol diglycidyl ether, tetraethylene glycol diglycidyl ether, nonaethylene glycol diglycidyl ether, propylene glycol diglycidyl ether, dipropylene glycol diglycidyl ether, tripropylene glycol diglycidyl ether, tetrapropylene glycol diglycidyl ether, nonapropylene glycol diglycidyl ether, neopentyl glycol diglycidyl ether, trimethylolpropane triglycidyl ether, glycerol triglycidyl ether, diglycerol tetraglycidyl ether, pentaerythritol tetraglycidyl ether, diglycidyl ethers of tris(2-hydroxyethyl)isocyanurate and triglycidyl ethers of tris(2-hydroxyethyl)isocyanurate Alicyclic epoxy compounds; isophoronediol diglycidyl ether and bis-2,2-hydroxycyclohexylpropane diglycidyl ether Aromatic epoxy compounds; resorcin diglycidyl ether, bisphenol A diglycidyl ether, bisphenol F diglycidyl ether, bisphenol S diglycidyl ether, orthophthalic acid diglycidyl esters, phenol novolakpolyglycidyl ether and cresol novolak polyglycidyl ether Besides the above compounds, epoxy-based compounds having a sulfur atom in the molecule in addition to an epoxy group may also be used. The sulfur atom-containing epoxy-based compounds contribute especially to the improvement of refractive index and are divided into chain aliphatic and cyclic aliphatic types exemplified by the following compounds.

Chain aliphatic sulfur atom-containing epoxy-based compounds; bis(2,3-epoxypropyl)sulfide, bis(2,3-epoxypropyl) disulfide, bis(2,3-epoxypropylthio)methane, 1,2-bis(2,3-epoxypropylthio)ethane, 1,2-bis(2,3-epoxypropylthio)propane, 1,3-bis(2,3-epoxypropylthio)propane, 1,3-bis(2,3-epoxypropylthio)-2-methylpropane, 1,4-bis(2,3-epoxypropylthio)butane, 1,4-bis(2,3-epoxypropylthio)-2-methylbutane, 1,3-bis(2,3-epoxypropylthio)butane, 1,5-bis(2,3-epoxypropylthio)pentane, 1,5-bis(2,3-epoxypropylthio)-2-methylpentane, 1,5-bis(2,3-epoxypropylthio)-3-thiapentane, 1,6-bis(2,3-epoxypropylthio)-2-methylhexane, 3,8-bis(2,3-epoxypropylthio)-3,6-dithiaoctane, 1,2,3-tris(2,3-epoxypropylthio)propane, 2,2-bis(2,3-epoxypropylthio)-1,3-bis(2,3-epoxypropylthio) propane and 2,2-bis(2,3-epoxypropylthiomethyl)-1-(2,3-epoxypropylthio)butane Cyclic aliphatic sulfur atom-containing epoxy-based compounds; 1,3-bis(2,3-epoxypropylthio)cyclohexane, 1,4-bis(2,3-epoxypropylthio)cyclohexane, 1,3-bis(2,3-epoxypropylthiomethyl)cyclohexane, 1,4-bis(2,3-epoxypropylthiomethyl)cyclohexane, 2,5-bis(2,3-epoxypropylthiomethyl)-1,4-dithiane, 2,5-bis(<2-(2,3-epoxypropylthio)ethyl>thiomethyl)-1,4-dithiane and 2,5-bis(2,3-epoxypropylthiomethyl)-2,5-dimethyl-1,4-dithiane <Olefin Compounds Including (meth)acrylate Compounds>

The olefin compounds including (meth)acrylate compounds have a radically polymerizable group in the molecule as a polymerizable group and are cured by radical polymerization. These compounds may be used to adjust the hardness of a lens. Examples thereof are given below.

(Meth)acrylate compounds; ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, propylene glycol diacrylate, propylene glycol dimethacrylate, dipropylene glycol diacrylate, dipropylene glycol dimethacrylate, tripropylene glycol diacrylate, tripropylene glycol dimethacrylate, polypropylene glycol dimethacrylate, polypropylene glycol diacrylate, neopentyl glycol diacrylate, neopentyl glycol dimethacrylate, ethylene glycol bisglycidyl acrylate, ethylene glycol bisglycidyl methacrylate, bisphenol A diacrylate, bisphenol A dimethacrylate, 2,2-bis[4-acryloxyethoxyphenyl]propane, 2,2-bis(4-methacryloxyethoxyphenyl)propane, 2,2-bis(4-acryloxydiethoxyphenyl) propane, 2,2-bis(4-methacryloxydiethoxyphenyl)propane, 2,2-bis(4-methacryloyloxyethoxyphenyl)propane, 2,2-bis(3,5-dibromo-4-methacryloyloxyethoxyphenyl) propane, 2,2-bis(4-methacryloyloxydipropoxyphenyl)propane, bisphenol F diacrylate, bisphenol F dimethacrylate, 1,1-bis(4-acryloxyethoxyphenyl)methane, 1,1-bis(4-methacryloxyethoxyphenyl)methane, 1,1-bis(4-acryloxydiethoxyphenyl)methane, 1,1-bis(4-methacryloxydiethoxyphenyl)methane, dimethylol tricyclodecane diacrylate, trimethylolpropane triacrylate, trimethylolpropane trimethacrylate, ditrimethylolpropane tetraacrylate, ditrimethylolpropane tetramethacrylate, glycerol diacrylate, glycerol dimethacrylate, pentaerythritol triacrylate, pentaerythritol tetraacrylate, pentaerythritol tetramethacrylate, methylthio acrylate, methylthio methacrylate, phenylthio acrylate, benzylthio methacrylate, xylylene dithiol diacrylate, xylylene dithiol dimethacrylate, mercaptoethyl sulfide diacrylate, mercaptoethyl sulfide dimethacrylate, bifunctional urethane acrylate and bifunctional urethane methacrylate Allyl compounds; allyl glycidyl ether, diallyl phthalate, diallyl terephthalate, diallyl isophthalate, diallyl carbonate, diethylene glycol bisallyl carbonate and methoxy polyethylene glycol allyl ether Vinyl compounds; a methyl styrene, a methyl styrene dimer, styrene, chlorostyrene, methyl styrene, bromostyrene, dibromostyrene, divinyl benzene and 3,9-divinyl spirobi(m-dioxane)

<(G) Polymerization-Curing Accelerator>

Various polymerization-curing accelerators may be used to accelerate the polymerization and curing of the photochromic composition of the present invention according to the types of the above-described compounds.

For example, when the polymerization-curing accelerator is used for a reaction between hydroxyl group and/or thiol group and NCO group and/or NCS group, a urethane or urea reaction catalyst or a condensation agent is used as the polymerization-curing accelerator.

When an episulfide-based, thietanyl-based or epoxy-based compound is used, an epoxy curing agent or a cationic polymerization catalyst for the ring-opening polymerization of an epoxy group is used as the polymerization-curing accelerator.

When an olefin-based compound containing a (meth) acrylic group is contained, a radical polymerization initiator is used as the polymerization-curing accelerator.

<Urethane or Urea Reaction Catalyst>

This reaction catalyst is used for the formation of a poly(thio)urethane bond through a reaction between a polyiso(thia)cyanate and a polyol or polythiol. Examples of this polymerization catalyst include tertiary amines, inorganic or organic salts corresponding to these, phosphines, quaternary ammonium salts, quaternary phosphonium salts, Lewis acids and organic sulfonic acids. Specific examples thereof are given below. When catalytic activity is too high according to the type of the selected compound, it can be controlled by using a mixture of a tertiary amine and a Lewis acid.

Tertiary amines; triethylamine, tri-n-propylamine, triisopropylamine, tri-n-butylamine, triisobutylamine, triethylamine, hexamethylene tetramine, N,N-dimethyl octylamine, N,N,N',N'-tetramethyl-1,6-diaminohexane, 4,4'-trimethylene bis(1-methylpyperidine) and 1,8-diazabicyclo-(5,4,0)-7-undecene Phosphines; trimethylphosphine, triethylphosphine, tri-n-propylphosphine, triisopropylphosphine, tri-n-butylphosphine, triphenylphosphine, tribenzylphosphine, 1,2-bis(diphenylphosphino)ethane and 1,2-bis(dimethylphosphino)ethane Quaternary ammonium salts; tetramethylammonium bromide, tetrabutylammonium chloride and tetrabutylammonium bromide Quaternary phosphonium salts; tetramethylphosphonium bromide, tetrabutylphosphonium chloride and tetrabutylphosphonium bromide Lewis acids; triphenyl aluminum, dimethyltin dichloride, dimethyltin bis(isooctylthioglycolate), dibutyltin dichloride, dibutyltin dilaurate, dibutyltin maleate, dibutyltin maleate polymer, dibutyltin dilicinolate, dibutyltin bis(dodecylmercaptide), dibutyltin bis(isooctylthioglycolate), dioctyltin dichloride, dioctyltin maleate, dioctyltin maleate polymer, dioctyltin bis(butyl maleate), dioctyltin dilaurate, dioctyltin dilicinolate, dioctyltin dioleate, dioctyltin di(6-hydroxy) caproate, dioctyltin bis(isooctyl thioglycolate), didodecyltin dilicinolate, metal salts such as copper oleate, copper acetylacetonate, iron acetylacetonate, iron naphthenate, iron lactate, iron citrate, iron gluconate, potassium octanoate and 2-ethylhexyl titanate Organic sulfonic acids; methane sulfonic acid, benzene sulfonic acid and p-toluene sulfonic acid <Condensation Agent>

Examples of the condensation agent are given below.

Inorganic acids; hydrogen chloride, hydrogen bromide, sulfuric acid and phosphoric acid Organic acids; p-toluenesulfonic acid and camphorsulfonic acid Acidic ion exchange resins; Amberlite and Amberlyst Carbodiimides; dicyclohexyl carbodiimide and 1-ethyl-3-(3-dimethylaminopyrrolyl)-carbodiimide <Epoxy Curing Agent>

Examples of the epoxy curing agent are given below.

Amine compounds and salts thereof; 2-methylimidazole, 2-ethyl-4-methylimidazole, 1,8-diazabicyclo(5,4,0)undecene-7-trimethylamine, benzyl dimethylamine, triethylamine, 2,4,6-tris(dimethylaminomethyl)phenol and 2-(dimethylaminomethyl)phenol Quaternary ammonium salts; tetramethylammonium chloride, benzyltrimethylammonium bromide and tetrabutylammonium bromide Organic phosphine compounds; tetra-n-butylphosphonium benzotriazolate and tetra-n-butylphosphonium-o,o-diethylphosphoro dithioate Metal carboxylic acid salts; chromium (III) tricarboxylate and tin octylate Acetylacetone chelate compounds; chromium acetylacetonate <Cationic Polymerization Catalyst>

Examples of the cationic polymerization catalyst are given below.

Lewis acid-based catalysts; $BF_3$.amine complex, $PF_5$, $BF_3$, $AsF_5$ and $SbF_5$ Thermosetting cationic polymerization catalysts; phosphonium salts, quaternary ammonium salts, sulfonium salts, benzylammonium salts, benzylpyridinium salts, benzylsulfonium salts, hydrazinium salts, carboxylic acid esters, sulfonic acid esters and amine imides Ultraviolet curable cationic polymerization catalysts; diaryl iodonium hexafluorophosphate and hexafluoroantimonic acid bis(dodecylphenyl)iodonium <Radical Polymerization Initiator>

Polymerization initiators include thermopolymerization initiators, and examples thereof are given below.

Diacyl peroxides; benzoyl peroxide, p-chlorobenzoyl peroxide, decanoyl peroxide and lauroyl peroxide Acetyl peroxide peroxy esters; t-butylperoxy-2-ethyl hexanate, t-butylperoxy neodecanate, cumyperoxy neodecanate and t-butylperoxy benzoate Percarbonates; diisopropylperoxy dicarbonate and di-sec-butylperoxy dicarbonate Azo compounds; azobisisobutyronitrile The above polymerization-curing accelerators (G) may be used alone or in combination of two or more, and its amount may be so-called "catalytic amount". For example, the amount of the accelerator may be 0.001 to 10 parts by mass, specifically 0.01 to 5 parts by mass based on 100 parts by mass of the total of the above components (A), (B) and (C). When the photochromic composition comprises the component (E), the amount of the accelerator may be 0.001 to 10 parts by mass, specifically 0.01 to 5 parts by mass based on 100 parts by mass of the total of the components (A), (B), (C) and (E).

<(H) Internal Release Agent>

Any internal release agent may be used in the present invention if it has a mold releasing effect and does not impair the physical properties such as transparency of a resin. However, a surfactant is preferably used. A phosphorus compound surfactant is more preferred, and a (thio)phosphate-based, (thio)phosphonate-based or (thio)phosphinate-based surfactant is much more preferred. A phosphite-based release agent may also be preferably used. The internal release agent as used herein also includes those which have a mold releasing effect out of the above catalysts, for example, quaternary ammonium salts and quaternary phosphonium salts. A suitable internal release agent is selected from these internal release agents from the viewpoints of combination with a monomer, polymerization conditions, economic efficiency and handling ease. Examples of the (thio)phosphate-based, (thio)phosphonate-based, (thio)phosphinate-based and phosphite-based internal release agents are given below Mono-n-butyl phosphate, mono-2-ethylhexyl phosphate, mono-n-octyl phosphate, mono-n-butyl phosphate, bis(2-ethylhexyl)phosphate, di(2-ethylhexyl)phosphate, di-n-octyl phosphate, di-n-butyl phosphate, O,O-dimethyl dithiophosphate, O,O-diethyl dithiophosphate, O,O-bis(2-ethylhexyl)dithiophosphate, O,O-dimethyl thiophosphate, O,O-diethyl thiophosphate, O,O-bis(2-ethylhexyl)thiophosphate, thiometon, disulfoton, O,O-diethyl S-methyl dithiophosphate, dipropylphosphinic acid, Chelex H-8, Chelex H-12 and Chelex H-18D which are phosphonic acid esters, PhoslexA-8, PhoslexA-10, PhoslexA-12, PhoslexA-13 and PhoslexA-18 which are phosphoric acid esters, PhoslexDT-8 which is a (thio)phosphoric acid ester, and Chelex TDP and Chelex OL which are phosphorous acid esters, all manufactured by SC Organic Chemical Co., Ltd., and JP-506H, JP-512 and JP-524R which are phosphoric acid esters and JP-312L, JP-333E and JP-318-O which are phosphorous acid esters, all manufactured by Johoku Chemical Co., Ltd.

The above internal release agents (H) may be used alone or in combination of two or more, and its amount may be small, for example, 0.001 to 10 parts by mass based on 100 parts by mass of the total of the components (A), (B) and (C). When the photochromic composition comprises the component (E), the amount is 0.001 to 10 parts by mass based on 100 parts by mass of the total of the components (A), (B), (C) and (E).

<Other Compounding Components>

As long as the effect of the present invention is not impaired, the photochromic composition of the present invention may comprise various compounding agents known per se, for example, stabilizers such as ultraviolet absorbent, antistatic agent, infrared absorbent, ultraviolet stabilizer, antioxidant, coloring inhibitor, antistatic agent, fluorescent dye, dye, pigment and flavoring agent, additives, solvent, leveling agent and polymerization control agent such as a thiol exemplified by t-dodecyl mercaptan as required.

Particularly when an ultraviolet stabilizer is used, it can improve the durability of the photochromic compound advantageously. As the ultraviolet stabilizer, there are known hindered amine optical stabilizers, hindered phenol antioxidants and sulfur-based antioxidants. Particularly preferred ultraviolet stabilizers are given below.

Bis(1,2,2,6,6-pentamethyl-4-piperidyl)sebacate, ADK STAB LA-52, LA-57, LA-62, LA-63, LA-67, LA-77, LA-82 and LA-87 of ADEKA Corporation, 2,6-di-t-butyl-4-methyl-phenol, ethylenebis(oxyethylene)bis[3-(5-t-butyl-4-hydroxy-m-tolyl)propionate], and IRGANOX 1010, 1035, 1075, 1098, 1135, 1141, 1222, 1330, 1425, 1520, 259, 3114, 3790, 5057, 565 and 245 of CIBA SPECIALTY CHEMICALS INC.

The amount of the ultraviolet stabilizer which is not particularly limited as long as the effect of the present invention is not impaired is generally 0.001 to 10 parts by mass, specifically 0.01 to 1 part by mass based on 100 parts by mass of the total of the component (A), (B) and (C). When the photochromic composition comprises the component (E), the amount is 0.001 to 10 parts by mass, specifically 0.01 to 1 part by mass based on 100 parts by mass of the total of the components (A), (B), (C) and (E). Particularly when a hindered amine optical stabilizer is used, it is used in an amount of preferably 0.5 to 30 moles, more preferably 1 to 20 moles, much more preferably 2 to 15 moles based on 1 mole of the photochromic compound (B) in order to prevent the shift of the adjusted developed color as there is a difference in the effect of improving durability according to the type of the photochromic compound.

Examples of the antistatic agent include alkali metals or alkali earth metal salts, quaternary ammonium salts, surfactants (nonionic surfactants, anionic surfactants, cationic surfactants and amphoteric surfactants), and ionic liquids (salts which are liquid at normal temperature as a pair of a cation and an anion). Specific examples thereof are given below.

Alkali metal or alkali earth metal salts; salts of an alkali metal (such as lithium, sodium or potassium) or alkali earth metal (such as magnesium or calcium) and an organic acid [mono- or di-carboxylic acid having 1 to 7 carbon atoms (such as formic acid, acetic acid, propionic acid, oxalic acid or succinic acid), sulfonic acid having 1 to 7 carbon atoms (such as methanesulfonic acid, trifluoromethanesulfonic acid or p-toluenesulfonic acid) or thiocyanic acid] and salts of the above organic acid and an inorganic acid [such as halogenated hydroacid (such as hydrochloric acid or hydrobromic acid), perhydrochloric acid, sulfuric acid, nitric acid or phosphoric acid]]

Quaternary ammonium salts; salts of amidinium (such as 1-ethyl-3-methylimidazolium) or guanidium (such as 2-dimethylamino-1,3,4-trimethylimidazolinium) and the above organic acid or inorganic acid Surfactants; sucrose fatty acid esters, sorbitan fatty acid esters, polyoxyethylene sorbitan fatty acid esters, polyoxyethylene fatty acid esters, fatty acid alkanol amides, polyoxyethylene alkyl ethers, alkyl glycosides, polyoxyethylene alkyl phenyl ethers, higher fatty acid salts (soap), α-sulfo fatty acid methyl ester salts, linear alkylbenzene sulfonic acid salts, alkyl sulfuric acid ester salts, alkyl ether sulfuric acid ester salts, (mono)alkyl phosphoric acid ester salts, α-olefin sulfonic acid salts, alkane sulfonic acid salts, alkyl trimethyl ammonium salts, dialkyl dimethyl ammonium salts, alkyl dimethylbenzyl ammonium salts, N-methyl bis-hydroxyethylamine fatty acid ester.hydrochloric acid salts, alkylamino fatty acid salts, alkyl betains and alkylamine oxides Ionic liquids; 1,3-ethylmethylimidazolium bistrifluoromethane sulfonimide, 1,3-ethylmethylimidazolium tetrafluoroborate, 1-ethylpyridinium bistrifluoromethane sulfonimide, 1-ethylpyridinium tetrafluoroborate, 1-ethylpyridinium hexafluorophosphate and 1-methylpyrazolium bistrifluoromethane sulfonimide <Preferred Composition of Photochromic Composition>

The above-described photochromic composition of the present invention is polymerized into a photochromic cured body by the kneading method. To develop the photochromic properties of this photochromic cured body, the photochromic compound (D) is used in an amount of 0.0001 to 10 parts by mass, preferably 0.001 to 2 parts by mass, most preferably 0.001 to 1 part by mass based on 100 parts by mass of the total of the components (A), (B) and (C). When the photochromic composition comprises the component (E), the photochromic compound (D) is used in an amount of 0.0001 to 10 parts by mass based on 100 parts by mass of the total of the components (A), (B), (C) and (E).

Further, in the present invention, to develop the maximum effect of improving photochromic properties, the molar ratio of functional groups, that is, a combination of a hydroxyl group and a thiol group and a combination of an isocyanate group and a thioisocyanate group is preferably set to ensure that the total amount of the hydroxyl group and the thiol group is 0.8 to 1.2 moles, preferably 0.85 to 1.15 moles, most preferably 0.9 to 1.1 moles based on 1 mole of the total of the isocyanate group and the thioisocyanate group.

<Preparation of Photochromic Composition>

The photochromic composition of the present invention can be prepared by mixing together the component (A), the component (B), the component (C) and the component (D) and optionally other components including the component (E). Alternately, it can be prepared by premixing together some of these components to prepare a premixture and then mixing the premixture with a remaining component(s) or another premixture.

As the method of preparing the photochromic composition of the present invention, (1) one in which a premixture of the component (A) and the component (D) and a premixture of the component (B) and the component (C) are prepared separately and then mixed together and (2) one in which a premixture of the component (B), the component (C) and the component (D) is prepared and then mixed with the component (A) are preferred. When the component (E) is used, the component (E) is preferably premixed into the premixture containing the component (B) in advance in the methods (1) and (2).

Further, even when a polymerization-curing accelerator as the component (G) is used, the component (G) is preferably premixed into the premixture containing the component (B) in advance in the above methods.

As described above, the curing reaction of the photochromic composition of the present invention is prevented from proceeding more than required before desired by the existence of the component (A) and the optional component (G), and the component (A) and the component (G) are separated from other components to make possible the reproduction of the curing reaction stably.

Therefore, according to the present invention, there is provided a composition for producing a photochromic cured body, which comprises (1) a combination of a premixture 1 of the component (A) and the component (D) and a premixture 2 of the component (B) and the component (C) or a combination of a premixture 3 of the component (B), the component (C) and the component (D), and the component (A), or (2) a combination of the above premixture 2 or the above premixture 3 and (E) a polyrotaxane having a composite molecular structure composed of an axial molecule and a plurality of cyclic molecules clathrating the axial molecule and contained in the premixture.

When other components including the above component (F) are contained in a premixture in addition to the above components (A) to (D), (E) and (G), they should be contained in a suitable premixture in consideration of reactivity with the other components. In this case, the other components may be added independently without being contained in the premixture.

<Use of Photochromic Composition>

As for the polymerization and curing of the photochromic composition of the present invention for producing a photochromic cured body, radical polymerization, ring-opening polymerization, anionic polymerization or condensation polymerization is carried out by heating, applying an active energy ray such as ultraviolet ray, $\alpha$-ray, $\beta$-ray or $\gamma$-ray as required or using both of them. That is, suitable polymerization means should be employed according to the form of a photochromic cured body to be formed.

To thermally polymerize the photochromic composition of the present invention, temperature in particular affects the properties of the obtained photochromic cured body. Since this temperature condition is affected by the type and amount of the thermopolymerization initiator and the types of the compounds, it cannot be specified unconditionally. In general, a process in which polymerization is started at a relatively low temperature and then the temperature is raised slowly is preferred. Since the polymerization time differs according to various factors like temperature, the optimum time is preferably determined according to these conditions. In general, it is preferred to choose conditions under which polymerization is completed in 2 to 48 hours. To obtain a photochromic laminated sheet, it is preferred that polymerization should be carried out at a temperature at which a reaction between polymerizable functional groups proceeds and that the optimum temperature and the optimum time for obtaining a target molecular weight should be determined at that time.

To develop photochromic properties by the kneading method using the above polymerization and curing, the above photochromic composition is injected into a space between glass molds held by an elastomer gasket or a spacer, fully defoamed and cast polymerized by heating in an air furnace or applying an active energy ray such as ultraviolet ray according to the type of a polymerization-curing accelerator to obtain a photochromic cured body molded in the form of an optical material such as a lens.

According to this process, a spectacle lens provided with photochromic properties is directly obtained.

The above-described photochromic composition of the present invention can develop excellent photochromic properties such as color optical density and fading speed and is effectively used to form an optical substrate provided with photochromic properties, for example, a photochromic lens, without reducing characteristic properties such as mechanical strength.

According to use purpose, the photochromic cured body formed from the photochromic composition of the present invention may be subjected to a post-treatment such as dying with a dye such as a dispersion dye, the formation of a hard coat film by using a silane coupling agent or a hard coating agent comprising sol of silicon, zirconium, antimony, aluminum, tin or tungsten as the main component, the formation of a thin film by the vapor deposition of a metal oxide such as $SiO_2$, $TiO_2$ or $ZrO_2$, an antireflection treatment with a thin film formed by applying an organic polymer, or an antistatic treatment.

EXAMPLES

The following examples are provided for the purpose of further illustrating the present invention but are in no way to be taken as limiting. In the following examples and comparative examples, the above components and the methods of evaluating photochromic properties are given below.
(A) Polyiso(thio)cyanate compound having at least two isocyanate groups and/or isothiocyanate groups in one molecule;
XDI: m-xylene diisocyanate
IPDI: isophorone diisocyanate
NBDI: (bicyclo[2.2.1]heptane-2,5(2,6)-diyl)bismethylene diisocyanate
NCO-1: 1,2-bis(2-isocyanatoethylthio)ethane
(B) Poly(thi)ol compound having at least two hydroxyl groups and/or thiol groups in one molecule
Polyols;
PL1: DURANOL of Asahi Kasei Chemicals Co., Ltd. (polycarbonate diol, number average molecular weight of 500)
PL2: DURANOL of Asahi Kasei Chemicals Co., Ltd. (polycarbonate diol, number average molecular weight of 800)
TMP: trimethylolpropane
Polythiols;
TMMP: trimethylolpropane tris(3-mercaptopropionate)
PEMP: pentaerythritol tetrakis(3-mercaptopropionate)
DPMP: dipentaerythritol hexakis(3-mercaptopropionate)
EGMP-4: tetraethylene glycol bis(3-mercaptopropionate)
SH-1: 1,2-bis[(2-mercaptoethyl)thio]-3-mercaptopropane
SQ107: COMPOCERAN SQ107 of Arakawa Chemical Industries, Ltd. (silsesquioxane type thiol)
Monool: MONOOLEIN of Tokyo Chemical Industry Co., Ltd. (glyceryl monooleate)
DTMP: ditrimethylolpropane
TMP-30: trimethylolpropane tripolyoxyethylene ether manufactured by Nippon Nyukazai Co., Ltd.
(C) Mono(thi)ol compound having one hydroxyl group or thiol group in one molecule
1-BO: 1-butanol (Mw=74)
1-HO: hexanol (Mw=102)
1-EO: 1-eicosanol (Mw=299)
PELE23: polyoxyethylene lauryl ether (n≈23, Mw=1198)
PGME2: polyethylene glycol monooleyl ether (n≈2, Mw=352)
PGME10: polyethylene glycol monooleyl ether (n≈10, Mw=668)
PGMS25: polyethylene glycol monostearate (n≈25, Mw=1386)
1-DT: 1-dodecanethiol (Mw=204)
n-OMP: n-octyl-3-mercaptopropionate (Mw=218)
SMP: stearyl-3-mercaptopropionate (Mw=359)
MP-70: polypropylene glycol monomethyl ether manufactured by Kao Corporation (Mw=439)
Photochromic compound (D);
PC1:

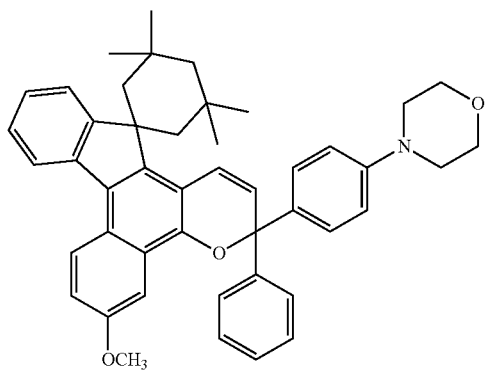 [SMILES: COc1ccc2c3c(c4c(c2c1)OC(c1ccccc1)(c1ccc(N2CCOCC2)cc1)C=C4)C1(CC(C)(C)CC(C)(C)C1)c1ccccc1-3]

(E) Polyrotaxane having a composite molecular structure composed of an axial molecule and a plurality of cyclic molecules clathrating the axial molecule
RX-1: polyrotaxane having a side chain with a hydroxyl group and an average molecular weight of about 600 and a weight average molecular weight of 700,000
RX-2: polyrotaxane having a side chain with a hydroxyl group and an average molecular weight of about 300 and a weight average molecular weight of 170,000
<Method of Preparing RX-1>
The method of preparing RX-1 as the component (E) described above is described below.
(1-1) Preparation of PEG-COOH;
Linear polyethylene glycol (PEG) having a molecular weight of 20,000 was prepared as a polymer for forming an axial molecule.
Formulation;
10 g of PEG, 100 mg of TEMPO (2,2,6,6-tetramethyl-1-piperidinyloxy radical) and 1 g of sodium bromide were dissolved in 100 mL of water.
5 mL of a commercially available sodium hypochlorite aqueous solution (effective chlorine concentration of 5%) was added to this solution and stirred at room temperature for 10 minutes. Thereafter, ethanol was added in an amount of up to 5 mL to terminate a reaction. After extraction was carried out by using 50 mL of methylene chloride, methylene chloride was distilled off, the obtained extract was dissolved in 250 mL of ethanol, and reprecipitation was carried out at −4° C. over 12 hours to collect PEG-COOH which was then dried.
(1-2) Preparation of Polyrotaxane;
3 g of PEG-COOH prepared above and 12 g of α-cyclodextrin (α-CD) were each dissolved in 50 mL of 70° C. hot water, and the obtained solutions were mixed together well by shaking. Then, this mixed solution was reprecipitated at a temperature of 4° C. for 12 hours, and the precipitated clathrate complex was freeze dried to be collected. Thereafter, 0.13 g of adamantane amine was dissolved in 50 ml of dimethyl formamide (DMF) at room temperature, and the above clathrate complex was added to and mixed well with the resulting solution by shaking quickly. Subsequently, a solution prepared by dissolving 0.38 g of a BOP reagent (benzotriazol-1-yl-oxy-tris(dimethylamino)phosphonium hexafluorophosphate) in DMF was further added to and mixed well with the obtained solution by shaking. Further, a solution prepared by dissolving 0.14 ml of diisopropylethylamine in DMF was added and mixed well by shaking to obtain a slurry reagent. The slurry reagent obtained above was left to stand at 4° C. for 12 hours. Thereafter, 50 ml of a mixed solvent of DMF and methanol (volume ratio of 1/1) was added to and mixed with the above reagent, and the supernatant was thrown away by centrifugation. After cleaning was carried out with the above DMF/methanol mixed solution, cleaning and centrifugation were carried out by using methanol to obtain a precipitate. The obtained precipitate was vacuum dried and then dissolved in 50 mL of DMSO, and the obtained transparent solution was added dropwise to 700 mL of water to precipitate a polyrotaxane. The precipitated polyrotaxane was collected by centrifugation and vacuum dried. The polyrotaxane was further dissolved in DMSO and precipitated in water, and the obtained precipitate was collected and dried to obtain a purified polyrotaxane. The clathration amount of α-CD was 0.25.
The clathration amount was calculated by dissolving the polyrotaxane in DMSO-$d_6$ and measuring with a $^1$H-NMR measuring instrument (JNM-LA500 of JEOL Ltd.) in accordance with the following method.
X, Y and X/(Y−X) mean the following.
X: integrated value of protons derived from the hydroxyl groups of 4 to 6 ppm of cyclodextrin Y: integrated value of protons derived from the methylene chains of 3 to 4 ppm of cyclodextrin and PEG X/(Y−X): proton ratio of cyclodextrin to PEG X/(Y−X) at the time when the maximum clathration amount was theoretically 1 was first calculated and compared with X/(Y−X) calculated from the analytical value of the actual compound to calculate the clathration amount.

(1-3) Introduction of Side Chain into Polyrotaxane;

500 mg of the above purified polyrotaxane was dissolved in 50 mL of a 1 mol/L NaOH aqueous solution, and 3.83 g (66 mmol) of propylene oxide was added and stirred at room temperature in an argon atmosphere for 12 hours. Then, the above polyrotaxane solution was neutralized to a pH of 7 to 8 by using a 1 mol/L HCl aqueous solution, and the neutralized polyrotaxane solution was dialyzed with a dialysis tube and then freeze dried to obtain a hydroxypropylated polyrotaxane.

The degree of modification of the OH groups of the cyclic molecules by the hydroxypropyl group was 0.5. 5 g of the obtained hydroxypropylated polyrotaxane was dissolved in 30 g of ε-caprolactone at 80° C. to prepare a mixed solution. After this mixed solution was stirred at 110° C. for 1 hour while dry nitrogen was blown, 0.16 g of a 50 wt % xylene solution of tin (II) 2-ethylhexanoate was added and stirred at 130° C. for 6 hours. Thereafter, xylene was added to obtain a polycaprolactone-modified polyrotaxane xylene solution having a nonvolatile concentration of about 35 mass % into which a side chain was introduced.

The polycaprolactone-modified polyrotaxane xylene solution prepared above was added dropwise to hexane to collect and dry the reaction product so as to obtain a side chain-modified polyrotaxane having an OH group as a polymerizable functional group (E). It was confirmed by $^1$H-NMR and GPC identification that the obtained hydroxypropylated polyrotaxane was hydroxypropylated polyrotaxane having a desired structure.

The physical properties of this polyrotaxane (RX-1) were as follows.

Degree of modification of side chain: 0.5
Molecular weight of side chain: about 600 on average
Weight average molecular weight Mw of polyrotaxane (GPC): 700,000

<Method of Preparing RX-2>

RX-2 was obtained in the same manner as RX-1 except that linear polyethylene glycol (PEG) having a molecular weight of 10,000 was used as the polymer for forming an axial molecule and the amount of ε-caprolactone was changed to 15 g. The physical properties of this polyrotaxane (RX-2) are as follows.

Degree of modification of side chain: 0.5
Molecular weight of side chain: about 300 on average
Weight average molecular weight Mw of polyrotaxane (GPC): 170,000.

(F) Resin modifier;
F-1: bis(2,3-epithiopropyl)disulfide
(G) Polymerization-curing accelerator
Urethane or urea reaction catalyst;
DBTD: dibutyltin dilaurate
(H) Internal release agent;
DBP: di-n-butyltin
A-12: lauryl acid phosphate (phosphoric acid ester) manufactured by SC Organic Chemical Co., Ltd.
DT-8: di(2-ethylhexyl)dithiophosphoric acid (thiophosphoric acid ester) manufactured by SC Organic Chemical Co., Ltd.
Other Compounding Components
Stabilizer;
HALS: bis(1,2,2,6,6-pentamethyl-4-piperidyl)sebacate (molecular weight of 508)
IRG245: IRGNOX245 (bis[3-(3-tert-butyl-4-hydroxy-5-methylphenyl)propionic acid][ethylenebis(oxyethylene)] manufactured by CIBA SPECIALTY CHEMICALS INC.

Example 1

A homogeneous solution (photochromic composition) was prepared by mixing together the following components in accordance with the following formulation. The amount of each component is shown in Table 1.

Formulation;
(A) Polyisocyanate compound: 45 parts by mass of XDI
(B) Poly(thi)ol compound: 37 parts by mass of PEMP
(C) Mono(thi)ol compound: 18 parts by mass of PGME10
(D) Photochromic compound: 0.04 part by mass of PC1
(G) Curing accelerator: 0.1 mass % of DBTD (based on the total weight of the mixture)
(H) Internal release agent: 0.1 mass % of DBP (based on the total weight of the mixture)

A photochromic cured body was obtained from the above photochromic composition by the kneading method. The polymerization method is shown below.

That is, after the above homogeneous solution was fully defoamed, it was injected into a molding mold composed of a casting mold including glass molds subjected to a release treatment and a gasket made of an ethylene-vinyl acetate copolymer. Then, the solution was cured over 15 hours while the temperature was gradually raised from 30° C. to 95° C. After the end of polymerization, the photochromic cured body was removed from the glass molds of the casting mold. The obtained photochromic cured body had a maximum absorption wavelength of 595 nm, a color optical density of 0.63 and a fading speed of 57 sec. The handling properties of the photochromic composition and the moldability of the obtained photochromic cured body were satisfactory. Further, the obtained photochromic cured body had an L-scale Rockwell hardness (HL) of 75. The maximum absorption wavelength, color optical density, fading speed, L-scale Rockwell hardness, moldability and handling properties were evaluated as follows.

[Evaluation Items]

(1) Maximum absorption wavelength (λmax): Maximum absorption wavelength after color development obtained by the spectrophotometer (instantaneous multi-channel photodetector MCPD1000) of Otsuka Electronics Co., Ltd. The maximum absorption wavelength is connected with color at the time of color development.

(2) Color optical density {ε(120)-ε(0)}: Difference between absorbance {ε(120)} after 120 seconds of exposure to light at the above maximum absorption wavelength and absorbance ε(0) before exposure. It can be said that as this value becomes larger, photochromic properties become more excellent. Color which was developed outdoors was evaluated visually.

(3) Fading speed [t½ (sec.)]: Time elapsed until the absorbance at the above maximum absorption wavelength of a sample drops to ½ of {ε(120)-ε(0)} when exposure is continued for 120 seconds and then stopped. It can be said that as this time becomes shorter, photochromic properties become more excellent.

(4) L-scale Rockwell hardness (HL): After the above cured body was kept indoors at 25° C. for one day, the L-scale Rockwell hardness of the photochromic cured body was measured by using the Akashi Rockwell hardness meter (model: AR-10).
(5) Moldability: The optical distortion of the molded photochromic cured body was checked visually. Moldability was evaluated based on the following criteria.
1: no optical distortion
2: optical distortion is observed in part of less than half of a lens
3: optical distortion is observed in half of a lens
4: optical distortion is observed in an entire lens
(6) Handling properties: handling properties were evaluated based on the following criteria when the composition was injected into a lens mold.
1: it can be injected into a lens mold without a problem
2: it can be injected into a lens mold without a problem though it has high viscosity
3: it can be injected into a lens mold though it has high viscosity and is difficult to handle
4: it has high viscosity and cannot be injected into a lens mold Examples 2 to 24, Comparative Example 1 and 2

Photochromic cured bodies were manufactured and evaluated in the same manner as in Example 1 except that photochromic compositions shown in Table 1 were used. The contents of the components (F), (G) and (G) and other components are represented by mass % based on 100 parts by mass of the total of the components (A), (B), (C) and (E). The results are shown in Table 2. The fading speed of Comparative Example 1 could not be measured as the color optical density was too low.

TABLE 1

| No. | Component (A) (parts by mass) | Component (B) (parts by mass) | Component (C) (parts by mass) | Component (E) | Component (D) | Component (F) | Component (G) | Component (H) | Other compounding components (mass %) |
|---|---|---|---|---|---|---|---|---|---|
| Ex. 1 | XDI(45) | PEMP(37) | PGME10(18) | — | PC1(0.04) | | DBTD(0.1) | DBP(0.3) | HALS(0.1) |
| Ex. 2 | XDI(36) | TMMP(21)/PEMP(21) | SMP(22) | | PC1(0.04) | | DBTD(0.1) | DBP(0.3) | |
| Ex. 3 | XDI(37) | PEMP(31) | n-OMP(32) | — | PC1(0.04) | | DBTD(0.1) | DBP(0.3) | |
| Ex. 4 | XDI(38) | DPMP(35) | 1-DT(27) | — | PC1(0.04) | | DBTD(0.1) | DBP(0.3) | |
| Ex. 5 | XDI(29) | DPMP(21) | 1-DT(26) | RX-1(24) | PC1(0.04) | | DBTD(0.1) | DBP(0.3) | HALS(0.1) |
| Ex. 6 | XDI(49) | SH-1(44) | PGMS25(8) | — | PC1(0.04) | | DBTD(0.1) | DBP(0.3) | |
| Ex. 7 | XDI(30) | DPMP(26) | SMP(44) | — | PC1(0.04) | | DBTD(0.1) | DBP(0.3) | |
| Ex. 8 | XDI(39) | DPNP(46) | 1-DT(13) | RX-1(2) | PC1(0.04) | | DBTD(0.1) | DBO(0.3) | |
| Ex. 9 | XDI(38) | DPMP(40) | 1-DT(17) | RX-1(5) | PC1(0.04) | | DBTD(0.1) | DBP(0.3) | |
| Ex. 10 | NCO-1(42) | PEMP(46) | 1-DT(7) | RX-1(5) | PC1(0.04) | | DBTD(0.1) | DBP(0.3) | |
| Ex. 11 | XDI(36) | TMMP(32) | 1-DT(11) | RX-1(21) | PC1(0.04) | F-1(5) | DBTD(0.1) | DBP(0.3) | HALS(0.1) |
| Ex. 12 | XDI(36) | PEMP(38)/SQ107(5) | n-OMP(14) | RX-1(7) | PC1(0.04) | | DBTD(0.1) | DBP(0.1) | HALS(0.1) |
| Ex. 13 | NBDI(48) | PL1(17)/TMP(17) | PGME2(5)/PGME10(13) | — | PC1(0.04) | | | DBP(0.3) | |
| Ex. 14 | NBDI(54) | PL1(23)/TMP(17) | PGME2(6) | — | PC1(0.04) | | | DBP(0.3) | |
| Ex. 15 | IPDI(57) | PL1(21)/TMP(17) | 1-BO(5) | — | PC1(0.04) | | | DBP(0.3) | |
| Ex. 16 | NBDI(55) | PL1(22)/TMP(17) | 1-HO(6) | — | PC1(0.04) | | | DBP(0.3) | HALS(0.1) |
| Ex. 17 | NBDI(47) | PL1(20)/TMP(16) | PGME2(1)/PGME10(9) | RX-1(9) | PC1(0.04) | | | DBP(0.3) | |
| Ex. 18 | IPDI(58) | PL1(23)/TMP(19) | 1-EO(2) | — | PC1(0.04) | | | DBP(0.3) | HALS(0.1) |
| Ex. 19 | NBDI(50) | PL1(21)/TMP(17) | PGME10(12) | — | PC1(0.04) | | | DBP(0.3) | |
| Ex. 20 | IPDI(50) | PL2(21)/TMP(17) | PELE23(7) | — | PC1(0.04) | | | DBP(0.3) | |
| Ex. 21 | NBDI(52) | PL1(24)/TMP(19) | PELE23(4) | — | PC1(0.04) | | | DBP(0.3) | |
| Ex. 22 | IPDI(50) | PL2(21)/TMP(17) | PGME10(11) | RX-1(1) | PC1(0.04) | | | DBP(0.3) | HALS(0.1) |
| Ex. 23 | NBDI(46) | TMP(18) | PGME2(9) | RX-1(27) | PC1(0.04) | | | DBP(0.3) | |
| Ex. 24 | NBDI(46) | PL1(19)/TMP(15) | PGME10(11) | RX-1(8) | PC1(0.04) | | | DBP(0.3) | |
| C. Ex. 1 | XDI(44) | PEMP(56) | — | — | PC1(0.04) | | DBTD(0.1) | DBP(0.3) | HALS(0.1) |
| C. Ex. 2 | NBDI(55) | PL1(25)/TMP(20) | — | — | PC1(0.04) | | | DBP(0.3) | |

Ex.: Example,
C. Ex.: Comparative Example

TABLE 2

| No. | Maximum absorption wavelength (λ max) | Color optical density | Fading speed (sec.) | HL | Moldability | Handling properties |
|---|---|---|---|---|---|---|
| Ex. 1 | 582 | 0.63 | 57 | 75 | 1 | 1 |
| Ex. 2 | 584 | 0.70 | 55 | 72 | 1 | 1 |
| Ex. 3 | 584 | 0.95 | 52 | 56 | 1 | 1 |
| Ex. 4 | 585 | 0.92 | 52 | 63 | 1 | 1 |
| Ex. 5 | 582 | 0.96 | 40 | 50 | 2 | 3 |
| Ex. 6 | 586 | 0.55 | 65 | 85 | 1 | 1 |
| Ex. 7 | 584 | 0.95 | 52 | 45 | 1 | 1 |
| Ex. 8 | 584 | 0.63 | 50 | 85 | 1 | 1 |
| Ex. 9 | 583 | 0.90 | 46 | 77 | 1 | 1 |
| Ex. 10 | 584 | 0.82 | 48 | 75 | 1 | 1 |
| Ex. 11 | 582 | 0.95 | 42 | 55 | 2 | 2 |
| Ex. 12 | 583 | 0.89 | 45 | 75 | 1 | 1 |
| Ex. 13 | 578 | 0.77 | 58 | 72 | 1 | 1 |
| Ex. 14 | 578 | 0.45 | 100 | 100 | 1 | 1 |
| Ex. 15 | 578 | 0.29 | 120 | 104 | 1 | 1 |
| Ex. 16 | 578 | 0.35 | 110 | 105 | 1 | 1 |
| Ex. 17 | 577 | 0.90 | 47 | 72 | 1 | 1 |
| Ex. 18 | 578 | 0.18 | 135 | 108 | 1 | 1 |
| Ex. 19 | 578 | 0.64 | 88 | 86 | 1 | 1 |
| Ex. 20 | 578 | 0.60 | 91 | 91 | 1 | 1 |
| Ex. 21 | 578 | 0.23 | 120 | 92 | 1 | 1 |
| Ex. 22 | 577 | 0.66 | 60 | 80 | 1 | 1 |
| Ex. 23 | 577 | 0.95 | 45 | 52 | 2 | 3 |
| Ex. 24 | 577 | 0.88 | 48 | 70 | 1 | 1 |
| C. Ex. 1 | 584 | 0.01 | Unmeasurable | 110 | 1 | 1 |
| C. Ex. 2 | 578 | 0.10 | 400 | 110 | 1 | 1 |

Ex.: Example,
C. Ex.: Comparative Example

As obvious from the above Examples and Comparative Examples, cured bodies obtained by polymerizing the photochromic compositions of the present invention are extremely excellent in photochromic properties.

Example 25

A homogeneous solution (photochromic composition) was prepared by mixing together the following components in accordance with the following formulation. The amount of each component is shown in Table 1.
Formulation;
(A) Polyisocyanate compound: 54 parts by mass of NBDI
(B) Poly(thi)ol compound: 23 parts by mass of PL1, 17 parts by mass of TMP
(C) Mono(thi)ol compound: 6 parts by mass of PGME2
(D) Photochromic compound: 0.04 part by mass of PC1
(I) Internal release agent: 0.1 mass % of DBP (based on the total weight of the mixture)

A photochromic cured body was obtained from the above photochromic composition by the kneading method. The polymerization method is described below.

A premixture of the component (A) and the component (D) and a premixture of the component (B), the component (C) and the component (H) were first prepared. When the component (A) and the component (D) were mixed together, stirring and mixing were carried out at room temperature and when the component (B), the component (C) and the component (H) were mixed together, stirring and mixing were carried out at 90° C. Then, these premixtures were mixed together at room temperature to obtain a homogeneous solution which was then fully defoamed. Thereafter, the solution was injected into a molding mold composed of a casting mold including glass molds subjected to a release treatment and a gasket made of an ethylene-vinyl acetate copolymer. Then, the solution was cured over 15 hours while the temperature was gradually raised from 30° C. to 95° C. After the end of polymerization, the photochromic cured body was removed from the glass molds of the casting mold. The obtained photochromic cured body had a maximum absorption wavelength of 578 nm, a color optical density of 0.45 and a fading speed of 100 sec. The handling properties of the photochromic composition and the moldability of the obtained photochromic cured body were satisfactory. Further, the obtained photochromic cured body had an L-scale Rockwell hardness (HL) of 100.

Examples 26 to 29

Photochromic cured bodies were manufactured and evaluated in the same manner as in Example 25 except that photochromic compositions shown in Table 3 were used and the component (E) was premixed with the component (B), the component (C) and the component (H). The amounts of the components (F) and (G) and the other components are represented by mass % based on 100 parts by mass of the total of the components (A), (B), (C) and (E). The results are shown in Table 4.

TABLE 3

| No. | Component (A) (parts by mass) | Component (B) (parts by mass) | Component (C) (parts by mass) | Component (E) | Component (D) | Component (H) | Others (mass %) |
|---|---|---|---|---|---|---|---|
| Ex. 25 | NBDI(54) | PL1(23)/TMP(17) | PGME2(6) | — | PC1(0.04) | DBP(0.3) | |
| Ex. 26 | NBDI(52) | monool(17)/TMP(9)/TMP-30(9)/DTMP(5) | MP-70(6) | RX-2(2) | PC1(0.04) | A-12(0.5) | IRG245 (0.1) |
| Ex. 27 | NBDI(51) | monool(18)/TMP(9)/TMP-30(9)/DTMP(5) | MP-70(6) | RX-2(2) | PC1(0.04) | A-12(0.1) DT-8(0.5) | |
| Ex. 28 | NBDI(50) | monool(20)/TMP(11)/TMP-30(11) | MP-70(6) | RX-2(2) | PC1(0.04) | A-12(0.1) DT-8(1) | IRG245 (0.1) |
| Ex. 29 | NBDI(49) | TMP(13)/TMP-30(13) | PGME10(18) | RX-2(7) | PC1(0.04) | A-12(0.5) | |

Ex.: Example

TABLE 4

| No. | Maximum absorption wavelength (λ max) | Color optical density | Fading speed (sec.) | HL | Moldability | Handling properties |
|---|---|---|---|---|---|---|
| Ex. 25 | 578 | 0.45 | 100 | 100 | 1 | 1 |
| Ex. 26 | 579 | 0.77 | 60 | 85 | 1 | 1 |
| Ex. 27 | 579 | 0.80 | 55 | 80 | 1 | 1 |
| Ex. 28 | 578 | 0.73 | 70 | 95 | 1 | 1 |
| Ex. 29 | 582 | 0.95 | 45 | 50 | 1 | 1 |

Ex.: Example

The photochromic cured bodies of Examples 1 to 29 have excellent photochromic properties and well-balanced physical properties including hardness, moldability and the handling properties of the photochromic compositions. On the other hand, the photochromic cured bodies of Comparative Examples 1 and 2 rarely develop photochromic properties though they have excellent physical properties such as hardness, moldability and the handling properties of the photochromic compositions.

Effect of the Invention

By using the photochromic composition of the present invention, as shown in Examples which have been described above, photochromic properties including improved color developability and fading speed can be developed.

The development of the above photochromic properties is due to the use of a mono(thi)ol compound having one hydroxyl group or thiol group in one molecule in combination with a photochromic compound, a polyiso(thio)cyanate compound and a poly(thi)ol compound. The inventors of the present invention consider the reason for this as follows.

That is, a net-like structure having a (thio)urethane bond is formed by reacting the polyiso (thio)cyanate compound with the poly(thi)ol compound to obtain a cured body having high hardness. The mono(thi)ol compound having a free structure at one end is introduced into the net-like structure by mixing the mono(thi)ol compound having one hydroxyl group or thiol group in one molecule with the photochromic composition, thereby forming a missing part in the net-like structure around the mono(thi)ol compound, that is, a flexible space. Therefore, it is believed that the reversible structural change of the photochromic compound existent near this space is caused to occur more swiftly, thereby improving the fading speed and the color optical density. Due to this function of the photochromic composition of the present invention, high photochromic properties can be developed even when a small amount of the photochromic compound is used. Therefore, even when a photochromic compound having low solubility is used, a photochromic cured body which is fully practically usable can be obtained.

Further, it is considered that, since it is possible to reduce the viscosity of the photochromic composition by adding the mono(thi)ol compound, handling performance at the time of cast molding can be improved with the result of improved moldability.

By further mixing the polyrotaxane with the above photochromic composition of the present invention, more excellent photochromic properties can be obtained. That is, it is believed that, as the cyclic molecules of the polyrotaxane can slide over the axial molecule and a space is formed around the cyclic molecules, the reversible structural change of the photochromic compound occurs swiftly due to this space with the result of improved fading speed and improved color optical density. Further, the introduction of the cyclic molecules into which the side chain has been introduced causes the reversible structural change of the photochromic compound existent near the side chain having high flexibility swiftly.

As understood from this, when a photochromic lens is to be molded, for example, by the kneading method, the photochromic composition of the present invention makes it possible to improve mechanical strength without impairing photochromic properties (color optical density and fading speed).

The invention claimed is:

1. A process for producing a photochromic cured body by curing a photochromic composition comprising (A) a polyiso(thio)cyanate compound having at least two isocyanate groups and/or isothiocyanate groups in one molecule, (B) a poly(thi)ol compound having at least two hydroxyl groups and/or thiol groups in one molecule, (C) a mono(thi)ol compound having one hydroxy group or thiol group in one molecule, (D) a photochromic compound, and (E) a polyrotaxane having a composite molecular structure composed of an axial molecule and a plurality of cyclic molecules clathrating the axial molecule.

2. The process for producing a photochromic cured body according to claim 1, wherein the photochromic composition comprises 2 to 40 parts by mass of the component (C) based on 100 parts by mass of the total of the components (A), (B) and (C).

3. The process for producing a photochromic cured body according to claim 1, wherein the cyclic molecules of the polyrotaxane are cyclodextrin rings.

4. The process for producing a photochromic cured body according to claim 1, wherein the axial molecule of the polyrotaxane has a chain structure having a bulky group at both ends, the chain part is formed of polyethylene glycol, and the bulky group at both ends is an adamantyl group.

5. The process for producing a photochromic cured body according to claim 1, wherein a side chain is introduced into the cyclic molecules of the polyrotaxane.

6. The process for producing a photochromic cured body according to claim 5, wherein the side chain is formed by the recurring unit of an organic chain having 3 to 20 carbon atoms.

7. The process for producing a photochromic cured body according to claim 5, wherein the side chain has a polymerizable functional group.

8. The process for producing a photochromic cured body according to claim 7, wherein the polymerizable functional group is an epoxy group, OH group, SH group, $NH_2$ group, episulfide group, thietanyl group, NCO group or NCS group.

9. The process for producing a photochromic cured body according to claim 1, wherein the photochromic composition comprises a mixture of a premixture of the component (A) and the component (D) and a premixture of the component (B), the component (C) and the component (E), or a mixture of a premixture of the component (B), the component (C), the component (D) and the component (E), and the component (A).

10. The process for producing a photochromic cured body according to claim 3, wherein the photochromic composition comprises a mixture of a premixture of the component (A) and the component (D) and a premixture of the component (B), the component (C) and the component (E), or a mixture of a premixture of the component (B), the component (C), the component (D) and the component (E), and the component (A).

11. The process for producing a photochromic cured body according to claim 4, wherein the photochromic composition comprises a mixture of a premixture of the component (A) and the component (D) and a premixture of the component (B), the component (C) and the component (E), or a mixture of a premixture of the component (B), the component (C), the component (D) and the component (E), and the component (A).

12. The process for producing a photochromic cured body according to claim 5, wherein the photochromic composition comprises a mixture of a premixture of the component (A) and the component (D) and a premixture of the component (B), the component (C) and the component (E), or a mixture of a premixture of the component (B), the component (C), the component (D) and the component (E), and the component (A).

13. The process for producing a photochromic cured body according to claim 6, wherein the photochromic composition comprises a mixture of a premixture of the component (A) and the component (D) and a premixture of the component (B), the component (C) and the component (E), or a mixture of a premixture of the component (B), the component (C), the component (D) and the component (E), and the component (A).

14. The process for producing a photochromic cured body according to claim 7, wherein the photochromic composition comprises a mixture of a premixture of the component (A) and the component (D) and a premixture of the component (B), the component (C) and the component (E), or a mixture of a premixture of the component (B), the component (C), the component (D) and the component (E), and the component (A).

15. The process for producing a photochromic cured body according to claim 8, wherein the photochromic composition comprises a mixture of a premixture of the component (A) and the component (D) and a premixture of the component (B), the component (C) and the component (E), or a mixture of a premixture of the component (B), the component (C), the component (D) and the component (E), and the component (A).

* * * * *